US010185845B2

(12) United States Patent
Kuwaki et al.

(10) Patent No.: US 10,185,845 B2
(45) Date of Patent: Jan. 22, 2019

(54) CARD READER AND MAGNETIC INFORMATION RECORDING MEDIUM PROCESSING DEVICE

(71) Applicant: NIDEC SANKYO CORPORATION, Suwa-gun, Nagano (JP)

(72) Inventors: Hirofumi Kuwaki, Nagano (JP); Kohei Kubota, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/554,933

(22) PCT Filed: Aug. 18, 2016

(86) PCT No.: PCT/JP2016/074110
§ 371 (c)(1),
(2) Date: Aug. 31, 2017

(87) PCT Pub. No.: WO2017/030165
PCT Pub. Date: Feb. 23, 2017

(65) Prior Publication Data
US 2018/0150656 A1    May 31, 2018

(30) Foreign Application Priority Data

Aug. 19, 2015  (JP) ................................ 2015-161801
Aug. 19, 2015  (JP) ................................ 2015-161802
Aug. 19, 2015  (JP) ................................ 2015-161803

(51) Int. Cl.
*G06K 7/00*        (2006.01)
*G06K 7/08*        (2006.01)
(Continued)

(52) U.S. Cl.
CPC ............. *G06K 7/0004* (2013.01); *G06K 7/00* (2013.01); *G06K 7/0021* (2013.01); *G06K 7/08* (2013.01);
(Continued)

(58) Field of Classification Search
USPC .................................................. 235/435–454
See application file for complete search history.

(56) References Cited

U.S. PATENT DOCUMENTS

| 4,136,819 A | * | 1/1979 | Torita | ..................... G06K 13/08 234/35 |
| 4,309,601 A | * | 1/1982 | Nally | ..................... G06K 7/084 235/449 |

FOREIGN PATENT DOCUMENTS

| JP | H11296630 A | 10/1999 |
| JP | 200344787 A | 2/2003 |
| JP | 2003108937 A | 4/2003 |

OTHER PUBLICATIONS

International Search Report for corresponding Application No. PCT/JP2016/074110; dated Oct. 25, 2016.

* cited by examiner

*Primary Examiner* — Jamara Franklin
(74) *Attorney, Agent, or Firm* — Cantor Colburn LLP

(57) ABSTRACT

A card reader may include a conveyance passage; an optical sensor; a first circuit board; a second circuit board; a first cover member; a second cover member; a first frame; and a second frame comprising a conveyance face on a second direction side of the card conveyance passage. The first frame may include a first transmission hole, and the first frame may be attached with one of the first circuit board and the second circuit board. The second frame may include a second transmission hole, and the second frame may be attached with the other of the first circuit board and the
(Continued)

second circuit board. The first cover member may be fixed to the first circuit board so as to cover the entire light emitting element; and the second cover member may be fixed to the second circuit board so as to cover the entire light receiving element.

19 Claims, 10 Drawing Sheets

(51) Int. Cl.
  *G06K 13/063*   (2006.01)
  *G06K 13/067*   (2006.01)
  *G06K 7/14*   (2006.01)
  *G11B 5/008*   (2006.01)

(52) U.S. Cl.
  CPC ......... *G06K 7/1404* (2013.01); *G06K 13/063* (2013.01); *G06K 13/067* (2013.01); *G11B 5/00808* (2013.01)

CARD READER AND MAGNETIC INFORMATION RECORDING MEDIUM PROCESSING DEVICE

CROSS REFERENCE TO RELATED APPLICATIONS

This is the U.S. national stage of application No. PCT/JP2016/074110, filed on Aug. 18, 2016. Priority under 35 U.S.C. § 119(a) and 35 U.S.C. § 365(b) is claimed from Japanese Application Nos. 2015-161801, filed on Aug. 19, 2015; JP2015-161802, filed on Aug. 19, 2015; and JP2015-161803, filed on Aug. 19, 2015 the disclosures of which are incorporated herein by reference.

TECHNICAL FIELD

At least an embodiment of the present invention relates to a card reader including an optical sensor for detecting a card which is conveyed along a card conveying passage. Further, at least an embodiment of the present invention relates to a card reader in which IC contact springs are contacted with external connection terminals of an IC contact formed on a card to perform data communication with the card. Further, at least an embodiment of the present invention relates to a magnetic information recording medium processing device structured to perform reading of magnetic data recorded in a magnetic information recording medium and/or recording of magnetic data to a magnetic information recording medium.

BACKGROUND

Conventionally, a card reader has been known which includes an optical sensor for detecting a card conveyed along a card conveying passage (see, for example, Patent Literature 1). The card reader described in Patent Literature 1 includes an upper guide block and a lower guide block, and a card conveying passage is formed between the upper guide block and the lower guide block. The optical sensor includes a light emitting element and a light receiving element which are disposed oppositely in a state interposing the card conveying passage. The light emitting element is mounted on a circuit board and the circuit board is fixed to the lower guide block. The light receiving element is mounted on a circuit board and the circuit board is fixed to the upper guide block.

In the card reader described in Patent Literature 1, through-holes for transmitting a light from the light emitting element to the light receiving element are formed in the upper guide block and the lower guide block. The through-hole formed in the lower guide block is fixed with a transparent cover for preventing dust and dirt entered into the card conveying passage or generated in the card conveying passage from sticking to the light emitting element. Further, the through-hole formed in the upper guide block is fixed with a transparent cover for preventing dust and dirt entered into the card conveying passage or generated in the card conveying passage sticking to the light receiving element. Therefore, in this card reader, dust and dirt in the card conveying passage can be prevented from passing through the through-holes by the covers fixed to the through-holes. As a result, dust and dirt in the card conveying passage can be prevented from sticking to the light emitting element and the light receiving element.

Conventionally, a contact type IC card reader has been known in which IC contact springs are contacted with external connection terminals of an IC contact formed on a card to perform data communication with the card (see, for example, Patent Literature 2). The card reader described in Patent Literature 2 includes a main body frame and an opening and closing part which is turnable with respect to the main body frame between a closing position where the IC contact springs can be contacted with external connection terminals of a card and an open position where the IC contact springs are exposed. The opening and closing part is turnable with respect to the main body frame with a turnable shaft disposed on a rear end side of the card reader as a turning center.

In the card reader described in Patent Literature 2, the opening and closing part includes an IC contact module having the IC contact springs, a turning member to which the IC contact module is detachably attached, a solenoid structured to turn the turning member, an image sensor, and a turning frame to which these structural members are attached. The solenoid and the image sensor are fixed to the turning frame, and the turning member is turnably supported by the turning frame. When the opening and closing part is located at the closing position, the solenoid turns the turning member between a contact position where the IC contact springs are contacted with the external connection terminals and a retreated position where the IC contact springs are separated from the external connection terminals. The IC contact module includes a holding member which holds the IC contact springs and a flexible printed circuit board with which the IC contact springs are electrically connected.

In the card reader described in Patent Literature 2, the IC contact module is attached to the turning member with a screw. The screw is exposed when the opening and closing part is moved to the open position and thus, in the card reader described in Patent Literature 2, the IC contact module can be attached to and detached from the turning member by moving the opening and closing part to the open position and the screw is attached or detached. In other words, in this card reader, the IC contact module can be relatively easily exchanged.

Conventionally, a magnetic information recording medium processing device has been known which is structured to perform reading of magnetic data recorded in a magnetic information recording medium and/or recording of magnetic data to a magnetic information recording medium (see, for example, Patent Literature 3). The magnetic information recording medium processing device described in Patent Literature 3 is formed with a medium conveying passage where a magnetic information recording medium is conveyed. Further, the magnetic information recording medium processing device includes a magnetic head assembly. The magnetic head assembly includes a magnetic head, a head bracket which holds the magnetic head, guide pins which are inserted into pin holes formed in the head bracket, and a frame body to which the guide pins are fixed.

In the magnetic information recording medium processing device described in Patent Literature 3, when a direction perpendicular to a conveying direction of a magnetic information recording medium conveyed along the medium conveying passage and to a thickness direction of the magnetic information recording medium is referred to as a width direction of the magnetic information recording medium, a side face of the frame body in the width direction of the magnetic information recording medium is formed with a screw hole for fixing the magnetic head assembly to a device frame. The magnetic head assembly is fixed to the device frame by a screw engaged into the screw hole of the frame body from one side in the width direction of the magnetic information recording medium.

CITATION LIST

[PTL 1] Japanese Patent Laid-Open No. 2005-216122
[PTL 2] Japanese Patent Laid-Open No. 2011-248652
[PTL 3] Japanese Patent Laid-Open No. 2007-66023

Recently, a card reader has been used under various environments. Therefore, depending on an environment where a card reader is used, even when a cover is fixed to a through-hole of an upper guide block and a through-hole of a lower guide block, dust and dirt in a card conveying passage may be entered into an arrangement portion of a circuit board where a light emitting element is mounted and/or an arrangement portion of a circuit board where a light receiving element is mounted due to wind or the like and, as a result, the dust and dirt may be stuck to the light emitting element and/or the light receiving element. When dust and dirt stick to the light emitting element and/or the light receiving element, a card may be erroneously detected and, as a result, the card reader may not be appropriately controlled.

SUMMARY

In view of the problem described above, at least an embodiment of the present invention provides a card reader including an optical sensor for detecting a card which is conveyed along a card conveying passage, the card reader being capable of preventing dust and dirt in the card conveying passage from sticking to a light emitting element and a light receiving element structuring the optical sensor irrespective of an environment where the card reader is used.

In order to simplify a structure of the contact type IC card reader described in Patent Literature 2, the present inventors have been examining a structure of a card reader in which a frame attached with an IC contact module, a solenoid, an image sensor and the like is not required to be turned with respect to a main body frame. However, in the IC card reader described in Patent Literature 2, when the frame to which an IC contact module, a solenoid and the like are attached is not structured so as to be capable of turning with respect to the main body frame, the IC contact module is unable to be exchanged easily.

In view of the problem described above, at least an embodiment of the present invention provides a card reader in which IC contact springs are contacted with external connection terminals of an IC contact formed on a card to perform data communication with the card and the card reader is capable of easily exchanging an IC contact module having the IC contact springs while simplifying the structure of the card reader.

In the magnetic information recording medium processing device described in Patent Literature 3, a circuit board on which electronic components and the like for controlling the magnetic information recording medium processing device are mounted is often disposed and attached along a side face of a device frame in a width direction of a magnetic information recording medium. Therefore, in the magnetic information recording medium processing device described in Patent Literature 3, an operational hole for passing a tool is sometimes formed in the circuit board so that, even in a state that the circuit board has been attached, the magnetic head assembly is capable of being attached to the device frame with a screw by using a tool such as a screwdriver or the like.

In this case, even in a state that the circuit board has been attached, the magnetic head assembly is capable of being attached to and detached from the device frame by utilizing the operational hole formed in the circuit board and thus the magnetic head assembly can be exchanged easily. However, when the operational hole is formed in the circuit board, a mounting area on the circuit board is reduced by an area of the operational hole and thus a size of the circuit board may be required to increase by the reduced mounting area.

In view of the problem described above, at least an embodiment of the present invention provides a magnetic information recording medium processing device which is capable of easily exchanging a magnetic head module having a magnetic head even in a state that a circuit board has been disposed and attached along a side face of a frame in a width direction of a magnetic information recording medium perpendicular to a conveying direction of the magnetic information recording medium conveyed along a medium conveying passage and to a thickness direction of the magnetic information recording medium and, even in a case that an operational hole is not formed in the circuit board.

MEANS TO SOLVE THE PROBLEMS

To achieve the above, at least an embodiment of the present invention provides a card reader including a card conveyance passage where a card is conveyed, an optical sensor structured to detect the card conveyed along the card conveyance passage, the optical sensor having a light emitting element and a light receiving element which are oppositely disposed so as to interpose the card conveyance passage in a thickness direction of the card conveyed along the card conveyance passage, a first circuit board on which the light emitting element is mounted, a second circuit board on which the light receiving element is mounted, a first cover member which covers the light emitting element, a second cover member which covers the light receiving element, a first frame which is formed with a conveyance face on a first direction side of the card conveyance passage wherein one side in a thickness direction of the card conveyed along the card conveyance passage is referred to as a first direction and its opposite direction is referred to as a second direction, and a second frame which is formed with a conveyance face on a second direction side of the card conveyance passage. The first frame is formed with a first transmission hole for transmitting a light from the light emitting element to the light receiving element and is attached with one of the first circuit board and the second circuit board, and the second frame is formed with a second transmission hole for transmitting the light from the light emitting element to the light receiving element and is attached with the other of the first circuit board and the second circuit board. The first cover member is fixed to the first circuit board so as to cover the entire light emitting element and the second cover member is fixed to the second circuit board so as to cover the entire light receiving element.

In the card reader in accordance with at least an embodiment of the present invention, the first cover member is fixed to the first circuit board so as to cover the entire light emitting element and the second cover member is fixed to the second circuit board so as to cover the entire light receiving element. Therefore, according to at least an embodiment of the present invention, even if dust and dirt entered into the card conveyance passage and/or dust and dirt generated in the card conveyance passage are passed through the first transmission hole and the second transmission hole and, even if dust and dirt are entered to an arrangement portion of the first circuit board and an arrangement portion of the second circuit board due to wind or the like, the dust and dirt can be prevented from sticking to the light emitting element and the light receiving element. Accordingly, in at least an embodiment of the present invention, irrespective of an environment where the card reader is used, dust and dirt can be prevented from sticking to the light emitting element and the light receiving element.

In at least an embodiment of the present invention, it is preferable that the card reader is disposed so that the thickness direction of the card and an upper and lower direction are coincided with each other, the first frame is formed with the conveyance face on a lower side of the card conveyance passage, the second frame is formed with the conveyance face on an upper side of the card conveyance passage and, in a case that the first circuit board is attached to the first frame, a gap space is formed between the first cover member and the first transmission hole when viewed in an upper and lower direction. Alternatively, in a case that the second circuit board is attached to the first frame, a gap space is formed between the second cover member and the first transmission hole when viewed in the upper and lower direction. According to this structure, dust and dirt in the card conveyance passage can be dropped to a lower side of the first cover member or the second cover member by utilizing the gap space formed on a lower side of the card conveyance passage. Therefore, dust and dirt can be restrained from accumulating on an upper face of the first cover member or an upper face of the second cover member which is disposed on a lower side of the card conveyance passage.

In at least an embodiment of the present invention, it is preferable that the first transmission hole is set to be larger than the second transmission hole and, in the case that the first circuit board is attached to the first frame, the second transmission hole is set to be smaller than an outward shape of the light receiving element when viewed in the upper and lower direction. Alternatively, in the case that the second circuit board is attached to the first frame, the second transmission hole is set to be smaller than an outward shape of the light emitting element when viewed in the upper and lower direction.

According to this structure, the first transmission hole is set to be larger than the second transmission hole. Therefore, in a case that the first circuit board is attached to the first frame, even in a state that the first frame and the second frame are fixed to each other so that the card conveyance passage is formed and, even in a state that the second circuit board is fixed to the second frame, when the first circuit board is detached, the entire under face of a portion of the second cover member where the light is passed can be cleaned by utilizing the first transmission hole and the second transmission hole. Further, the first transmission hole is set to be larger than the second transmission hole. Therefore, in a case that the second circuit board is attached to the first frame, even in a state that the first frame and the second frame are fixed to each other and, even in a state that the first circuit board is fixed to the second frame, when the second circuit board is detached, the entire under face of a portion of the first cover member where the light is passed can be cleaned by utilizing the first transmission hole and the second transmission hole.

Further, according to the above-mentioned structure, in a case that the first circuit board is attached to the first frame, when viewed in the upper and lower direction, the second transmission hole is smaller than an outward shape of the light receiving element. Alternatively, in a case that the second circuit board is attached to the first frame, when viewed in the upper and lower direction, the second transmission hole is smaller than an outward shape of the light emitting element. Therefore, for example, even when a plurality of optical sensors are disposed in the card reader, a light emitted from a light emitting element of a certain optical sensor can be prevented from being received by a light receiving element of another optical sensor.

In at least an embodiment of the present invention, it is preferable that the first circuit board is attached to the first frame and the second transmission hole is smaller than the outward shape of the light receiving element when viewed in the upper and lower direction. According to this structure, influence of an external light to the light receiving element can be reduced.

In at least an embodiment of the present invention, it is preferable that the card reader includes a plurality of the light emitting elements and a plurality of the light receiving elements, the plurality of the light emitting elements are mounted on the common first circuit board and the plurality of the light receiving elements are mounted on the common second circuit board. According to this structure, in a case that the first circuit board is detached from the first frame for cleaning the first cover member, when the common first circuit board is detached, the plurality of the first cover members can be cleaned together. Further, in a case that the second circuit board is detached from the second frame for cleaning the second cover member, when the common second circuit board is detached, the plurality of the second cover members can be cleaned together. Therefore, the first cover member and the second cover member can be easily cleaned.

To achieve the above, at least an embodiment of the present invention provides a card reader which is structured so that IC contact springs are contacted with external connection terminals of an IC contact formed on a card to perform data communication with the card. The card reader includes an IC contact module having the IC contact springs and a circuit board in a flat plate shape which is electrically connected with the IC contact springs, a card conveyance passage where the card is conveyed, a drive source structured to move the IC contact module between a retreated position where the IC contact springs are retreated from the card conveyance passage and a contact position where the IC contact springs are capable of contacting with the external connection terminals, and a lever member which connects the drive source with the IC contact module. When one side in a thickness direction of the card conveyed along the card conveyance passage is referred to as a first direction and the other side is referred to as a second direction, the drive source, the lever member and the IC contact module located at the retreated position are disposed on the second direction side with respect to the card conveyance passage, and the lever member includes a module fixing part to which the IC contact module is fixed. The IC contact module is fixed to the module fixing part by a screw engaging with the module fixing part from the second direction side in a state that a part of the IC contact module is overlapped with the module fixing part from the second direction side, and the drive source and the screw are not overlapped and are displaced from each other when viewed in the thickness direction of the card.

In the card reader in accordance with at least an embodiment of the present invention, when one side in a thickness direction of the card conveyed along the card conveyance passage is referred to as a first direction and the other side is referred to as a second direction, the drive source, the lever member and the IC contact module located at the retreated position are disposed on the second direction side with respect to the card conveyance passage, and the IC contact module is fixed to the module fixing part by a screw engaging with the module fixing part from the second direction side in a state that a part of the IC contact module is overlapped with the module fixing part from the second direction side. Further, in at least an embodiment of the present invention, the drive source and the screw are not overlapped with each other and are displaced from each other when viewed in the thickness direction of the card. Therefore, according to at least an embodiment of the present invention, even in a case that the frame to which the IC contact module and the drive source are attached is structured so as not to be capable of turning with respect to another frame and, even when the drive source is not detached, the IC contact module can be attached to and detached from the lever member from the second direction side by attaching and detaching the screw from the second direction side. Accordingly, in at least an embodiment of the present invention, the IC contact module can be exchanged easily while simplifying a structure of the card reader.

In at least an embodiment of the present invention, for example, a part of the circuit board is overlapped with the module fixing part from the second direction side and the circuit board is fixed to the module fixing part by the screw.

In at least an embodiment of the present invention, it is preferable that the drive source and the IC contact module are not overlapped with each other and are displaced from each other when viewed in the thickness direction of the card. According to this structure, when the IC contact module is to be attached to and detached from the lever member, the drive source and the IC contact module can be prevented from interfering with each other. Therefore, the IC contact module can be further easily exchanged.

In at least an embodiment of the present invention, for example, the drive source and the IC contact module are displaced from each other in a conveying direction of the card which is conveyed along the card conveyance passage. In this case, the size of the card reader can be reduced in a width direction of a card which is perpendicular to the conveying direction of the card and a thickness direction of the card and in the thickness direction of the card.

In at least an embodiment of the present invention, it is preferable that the card reader includes a frame which is formed with a conveyance face of the card conveyance passage, the IC contact module includes an optical sensor having a light emitting element and a light receiving element oppositely disposed to the light emitting element, and the optical sensor is mounted the circuit board. The frame is formed with a light intercepting part structured to intercept a light from the light emitting element to the light receiving element and, when the IC contact module is moved to the contact position, the light from the light emitting element to the light receiving element is intercepted by the light intercepting part and thereby it is detected that the IC contact module has been moved to the contact position. According to this structure, the circuit board with which the IC contact springs are electrically connected is mounted with the optical sensor and thus, even when the optical sensor is provided for detecting that the IC contact module has been moved to the contact position, a circuit board on which the optical sensor is mounted is not required to be separately provided. Therefore, a structure of the card reader can be simplified.

To achieve the above, at least an embodiment of the present invention provides a magnetic information recording medium processing device including a medium conveyance passage where a magnetic information recording medium on which magnetic data are recorded is conveyed, a magnetic head module having a magnetic head disposed so as to face the medium conveyance passage from a first direction side wherein one side in a thickness direction of the magnetic information recording medium conveyed along the medium conveyance passage is referred to as a first direction, and a frame which is formed with a conveyance face on the first direction side of the medium conveyance passage. The frame is formed with an opening part in which the magnetic head is disposed and a module fixing part to which the magnetic head module is fixed, and the magnetic head module includes a head holding part which holds the magnetic head so that the magnetic head is capable of turning with a conveying direction of the magnetic information recording medium conveyed along the medium conveyance passage as an axial direction of turning, and so that the magnetic head is capable of moving in the thickness direction of the magnetic information recording medium, and the magnetic head module is fixed to the module fixing part from the first direction side.

The magnetic information recording medium processing device in at least an embodiment of the present invention includes, when one side in a thickness direction of a magnetic information recording medium conveyed along the medium conveyance passage is referred to as a first direction, a magnetic head module having a magnetic head disposed so as to face the medium conveyance passage from the first direction side, and a frame which is formed with a conveyance face on the first direction side of the medium conveyance passage. Further, the magnetic head module is fixed to the module fixing part of the frame from the first direction side. Therefore, in at least an embodiment of the present invention, the magnetic head module can be attached to and detached from the frame from the first direction side. Accordingly, in at least an embodiment of the present invention, even in a state that a circuit board is attached along one of side faces of the frame in a width direction of a magnetic information recording medium conveyed along the medium conveyance passage and, even when an operational hole is not formed in the circuit board, the magnetic head module having the magnetic head can be exchanged easily.

In at least an embodiment of the present invention, it is preferable that the head holding part includes a fixed member which is fixed to the module fixing part, the fixed member is formed with a guide part which is disposed on both sides with respect to the magnetic head in the conveying direction of the magnetic information recording medium, and the guide part is disposed in the opening part so as to face the medium conveyance passage. According to this structure, a protruding amount of the magnetic head protruding toward the medium conveyance passage from the guide part can be set with a high degree of accuracy. Therefore, a contact pressure of the magnetic head with a magnetic information recording medium conveyed along the medium conveyance passage can be set with a high degree of accuracy. As a result, reading of magnetic data recorded in a magnetic information recording medium and/or recording of magnetic data to a magnetic information recording medium can be performed appropriately.

In at least an embodiment of the present invention, for example, the magnetic head module is fixed to the module fixing part by a screw engaged with the module fixing part from the first direction side. In this case, the magnetic head module can be attached to and detached from the frame from the first direction side by attaching and detaching the screw from the first direction side.

As described above, according to at least an embodiment of the present invention, in the card reader including an optical sensor for detecting a card which is conveyed along the card conveyance passage, irrespective of an environment where the card reader is used, dust and dirt in the card conveyance passage can be prevented from sticking to the light emitting element and the light receiving element which structure the optical sensor.

Further, as described above, according to at least an embodiment of the present invention, in the card reader which is structured so that IC contact springs are contacted with external connection terminals of an IC contact formed on a card to perform data communication with the card, the IC contact module having the IC contact springs can be exchanged easily while simplifying a structure of the card reader.

Further, as described above, according to at least an embodiment of the present invention, even in a state that a circuit board is attached along one of side faces of the frame in a width direction of a magnetic information recording medium which is perpendicular to a conveying direction of the magnetic information recording medium conveyed along the medium conveyance passage and a thickness direction of the magnetic information recording medium and, even when an operational hole is not formed in the circuit board, the magnetic head module having the magnetic head can be exchanged easily.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 12A and 12C are views showing a state when the IC contact module is located at a retreated position where IC contact springs are retreated from a card conveying passage. FIGS. 12B and 12D are views showing a state when the IC contact module is located at a contact position where the IC contact springs are capable of contacting with external connection terminals.

DETAILED DESCRIPTION

At least an embodiment of the present invention will be described below with reference to the accompanying drawings.

(Entire Structure of Card Reader)

Figure 1:
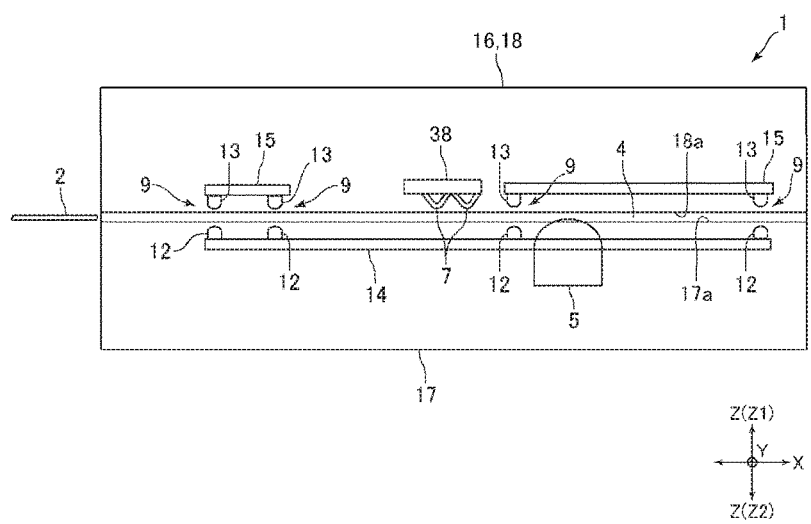
FIG. 1 is an explanatory side view showing a schematic structure of a magnetic information recording medium processing device, in other words, a card reader in accordance with an embodiment of the present invention.
Figure 2:
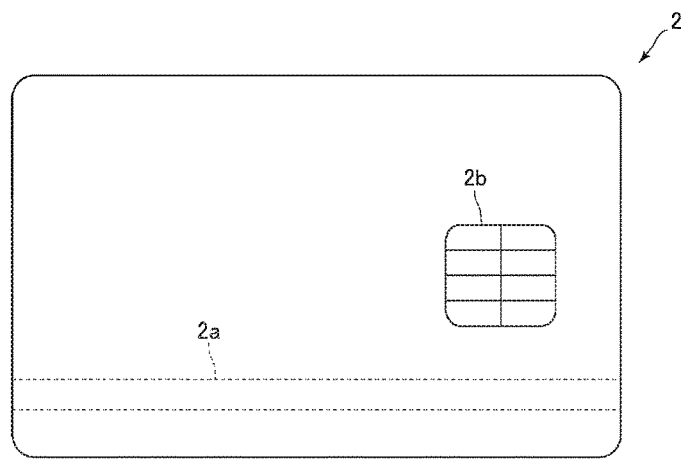
FIG. 2 is a plan view showing a card in FIG. 1.
Figure 3:
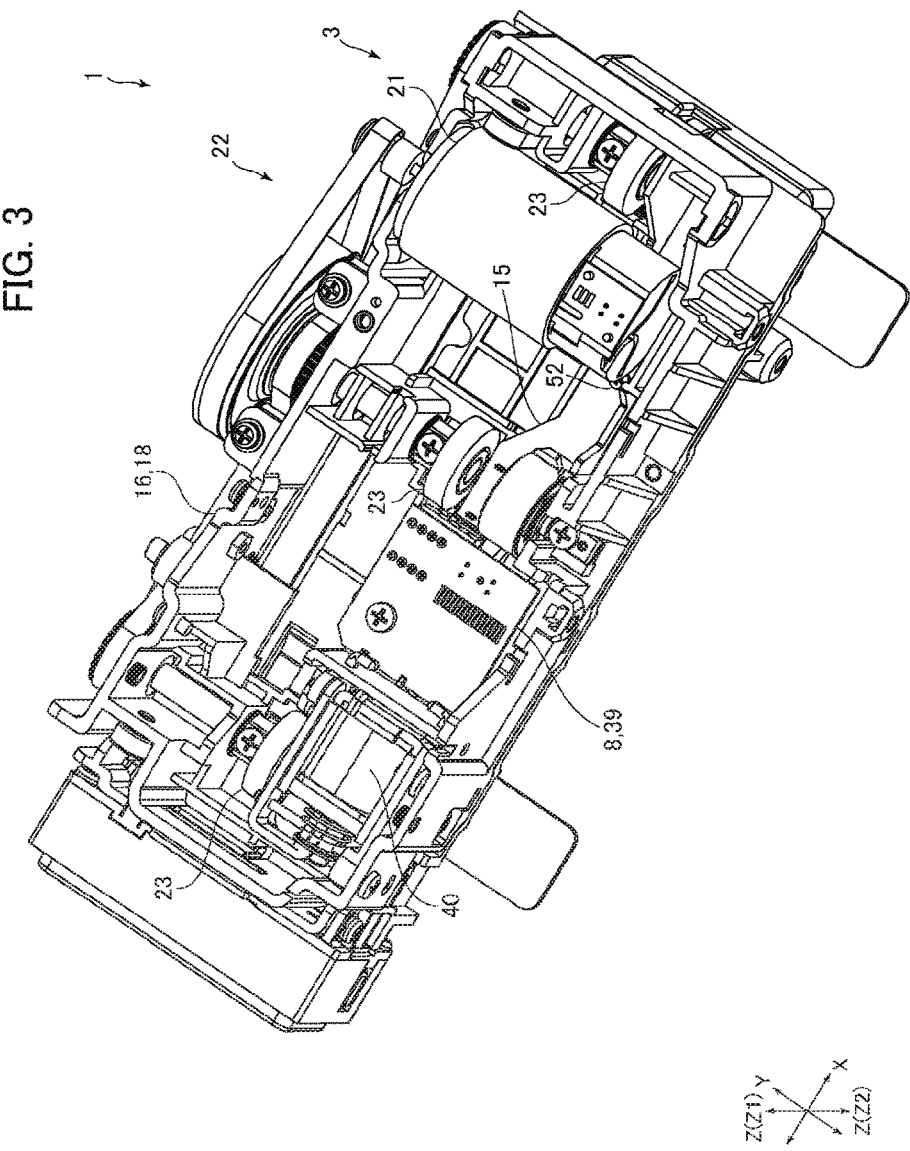
FIG. 3 is a perspective view showing the magnetic information recording medium processing device, in other words, the card reader shown in FIG. 1 which is viewed from an upper side.
Figure 4:
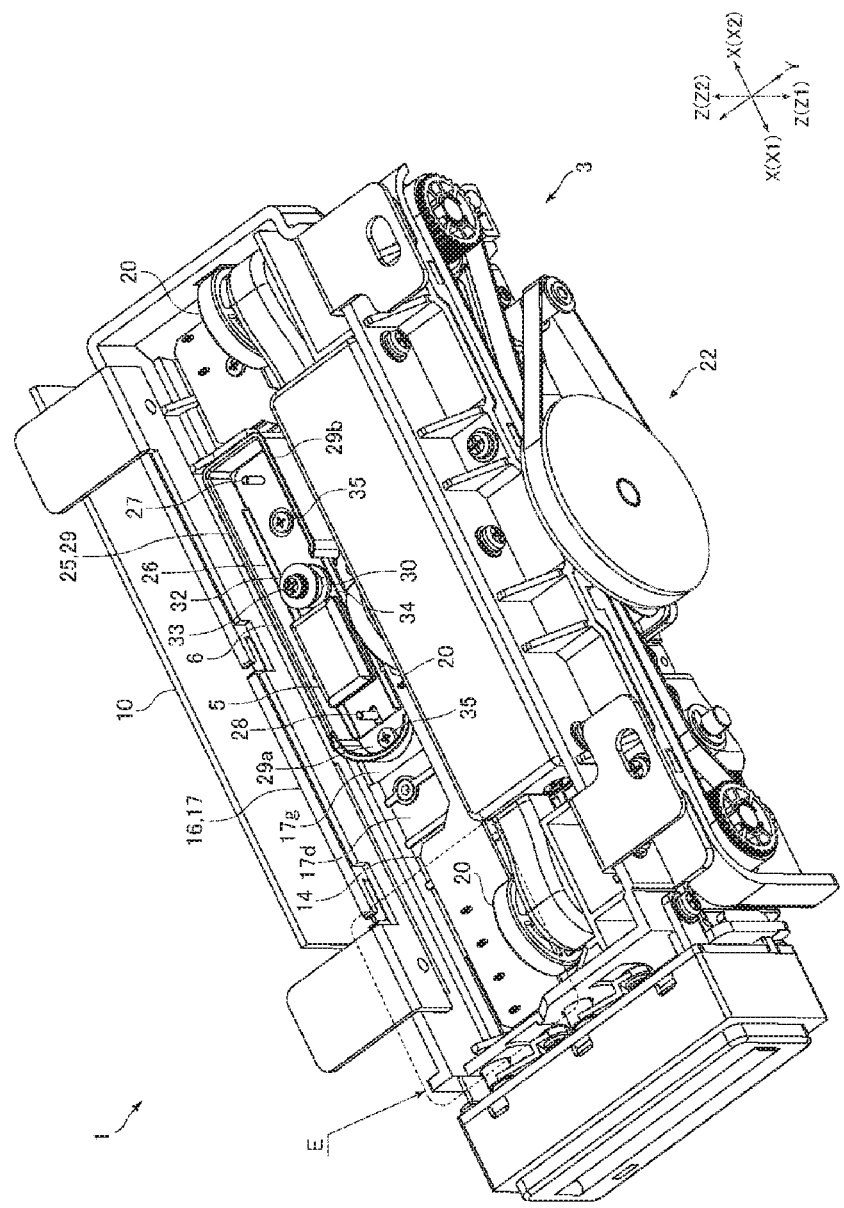
FIG. 4 is a perspective view showing the magnetic information recording medium processing device, in other words, the card reader shown in FIG. 1 which is viewed from a lower side.

FIG. 1 is an explanatory side view showing a schematic structure of a magnetic information recording medium processing device 1 in accordance with an embodiment of the present invention. FIG. 2 is a plan view showing a card 2 in FIG. 1. FIG. 3 is a perspective view showing the magnetic information recording medium processing device 1 shown in FIG. 1 which is viewed from an upper side. FIG. 4 is a perspective view showing the magnetic information recording medium processing device 1 shown in FIG. 1 which is viewed from a lower side.

A magnetic information recording medium processing device 1 in this embodiment is a device which is structured to perform reading of data recorded in a card 2 as a magnetic information recording medium where magnetic data are recorded and/or recording data to the card 2. Therefore, in the following descriptions, the magnetic information recording medium processing device 1 is referred to as a "card reader 1". The card reader 1 is mounted on a predetermined host apparatus such as an ATM and is used. Further, the card reader 1 is a card conveyance type card reader including a card conveying mechanism 3 structured to convey a card 2. A card conveyance passage 4 as a medium conveyance passage where a card 2 is conveyed is formed in an inside of the card reader 1. In FIG. 1, the card conveying mechanism 3 is not shown.

A card 2 is, for example, a substantially rectangular card made of vinyl chloride whose thickness is about 0.7-0.8 mm. As shown in FIG. 2, a rear face of the card 2 is formed with a magnetic stripe 2a in which magnetic data are recorded. Further, an IC chip is incorporated into the card 2 and a front face of the card 2 is formed with external connection terminals 2b of the IC chip. In accordance with an embodiment of the present invention, the card 2 may be a PET (polyethylene terephthalate) card whose thickness is about 0.18-0.36 mm or may be a paper card having a predetermined thickness.

As shown in FIG. 1, a card 2 which is conveyed along the card conveyance passage 4 is moved in the "X" direction. In other words, the "X" direction is a conveying direction of a card 2. The "Z" direction perpendicular to the "X" direction is a thickness direction of a card 2 which is conveyed along the card conveyance passage 4, and the "Y" direction perpendicular to the "Z" direction and the "X" direction is a width direction of the card 2 conveyed along the card conveyance passage 4. The card reader 1 in this embodiment is disposed so that the thickness direction of the card 2 and an upper and lower direction (vertical direction) are coincided with each other.

In the following descriptions, the "X" direction is referred to as a front and rear direction, the "Y" direction is referred to as a right and left direction, and the "Z" direction is referred to as an upper and lower direction. Further, the "X1" direction which is one side in the "X" direction is referred to as a "front" direction, the "X2" direction which is its opposite direction is referred to as a "rear" direction, the "Z1" direction which is one side in the "Z" direction is referred to as an "upper" direction, and the "Z2" direction which is its opposite direction is referred to as a "lower" direction. A lower direction ("Z2" direction) in this embodiment is a first direction which is one side in the thickness direction of a card 2, and an upper direction ("Z1" direction) is a second direction which is its opposite direction (the other side in the thickness direction of the card 2).

The card reader 1 includes a magnetic head module 6 (see FIG. 4) having a magnetic head 5 structured to perform reading of magnetic data recorded in a magnetic stripe 2a and recording of magnetic data to the magnetic stripe 2a, an IC contact module 8 (see FIG. 3) having IC contact springs 7 structured to contact with external connection terminals 2b to perform communication with a card 2, optical sensors 9 (see FIG. 1) structured to detect the card 2 conveyed along the card conveying passage 4, and a circuit board 10 (see FIG. 4) on which electronic components for controlling the card reader 1 are mounted. The optical sensor 9 includes a light emitting element 12 and a light receiving element 13 which are oppositely disposed so as to interpose the card conveying passage 4 in the upper and lower direction.

The card reader 1 includes the IC contact module 8 having IC contact springs 7 which are structured to contact with external connection terminals 2b to perform communication with a card 2. In other words, in the card reader 1, the IC contact springs 7 are contacted with external connection terminals 2b of a card 2 to perform data communication with the card 2. In addition, the card reader 1 includes a circuit board 14 on which the light emitting elements 12 are mounted, circuit boards 15 on which the light receiving elements 13 are mounted, and a main body frame 16 to which the card conveying mechanism 3, the magnetic head module 6, the IC contact module 8 and the circuit boards 14 and 15 are attached.

The main body frame 16 is structured of a lower frame 17 as a first frame, which structures a lower side portion of the main body frame 16, and an upper frame 18 as a second frame which structures an upper side portion of the main body frame 16. In other words, the lower frame 17 and the upper frame 18 are fixed to each other to structure the main body frame 16. The lower frame 17 and the upper frame 18 are formed of resin material. In other words, the main body frame 16 in this embodiment is formed of only resin material. The card conveying passage 4 is formed between the lower frame 17 and the upper frame 18. The lower frame 17 is formed with a lower conveyance face 17a of the card conveyance passage 4 and the upper frame 18 is formed with an upper conveyance face 18a of the card conveyance passage 4.

The card conveying mechanism 3 includes conveying rollers 23 (see FIG. 3) structured to abut with an upper face of a card 2 to convey the card 2, a motor 21 structured to drive the conveying rollers 23, a power transmission mechanism 22 which transmits power of the motor 21 to the conveying rollers 23, and pad rollers 20 (see FIG. 4) which are oppositely disposed to the conveying rollers 23. The power transmission mechanism 22 is structured of a plurality of pulleys, a belt and the like.

The magnetic head 5 is disposed so as to face the card conveying passage 4 from a lower side. Specifically, the magnetic head 5 is disposed so that a magnetic gap of the magnetic head 5 faces the card conveying passage 4 from a lower side. The magnetic head module 6 includes a head holding part 25 (see FIG. 4) which holds the magnetic head 5 so that the magnetic head 5 is capable of turning with the front and rear direction as an axial direction of turning and, in addition, so that the magnetic head 5 is capable of moving in the upper and lower direction. The head holding part 25 includes a plate spring 26 to which the magnetic head 5 is fixed, two support pins 27 and 28 which support the plate spring 26, a fixed member 29 to which the support pins 27 and 28 are fixed and which is fixed to the lower frame 17, and a compression coil spring 30 which urges the plate spring 26 to an upper side.

The circuit board 10 is a rigid circuit board such as a glass epoxy board and is formed in a flat plate shape. The circuit board 10 is fixed to the main body frame 16. Further, the circuit board 10 is disposed along a side face of the main body frame 16 in the right and left direction so that a thickness direction of the circuit board 10 and the right and left direction are coincided with each other. In this embodiment, as shown in FIG. 4, the circuit board 10 is disposed along one of side faces of the main body frame 16 in the right and left direction, and the pulleys, the belt and the like structuring the power transmission mechanism 22 are disposed on the other of the side faces of the main body frame 16 in the right and left direction. In FIG. 3, the circuit board 10 is not shown.

The IC contact module 8 includes an IC contact block 38 (see FIG. 1) which holds the IC contact springs 7 and a flat plate-shaped circuit board 39 (see FIG. 3) with which the IC contact springs 7 are electrically connected. The IC contact module 8 is disposed so that the IC contact springs 7 face the card conveying passage 4 from an upper side with respect to the card conveying passage 4. The IC contact module 8 is connected with a solenoid 40 which is structured to move the IC contact module 8 between a retreated position where the IC contact springs 7 are retreated from the card conveying passage 4 and a contact position where the IC contact springs 7 are capable of contacting with external connection terminals 2b of a card 2 (see FIG. 3). Specifically, the IC contact module 8 is connected with a solenoid 40 through a lever member.

The light emitting elements 12 are disposed to a lower side of the card conveyance passage 4. The light emitting elements 12 are mounted on an upper face of the circuit board 14 which is a rigid circuit board such as a glass epoxy board. The light receiving elements 13 are disposed to an upper side of the card conveyance passage 4. Further, the light receiving elements 13 are mounted on a lower face of the circuit board 15 which is a rigid circuit board such as a glass epoxy board.

(Structure of Peripheral Portion of Optical Sensors)

Figure 5:
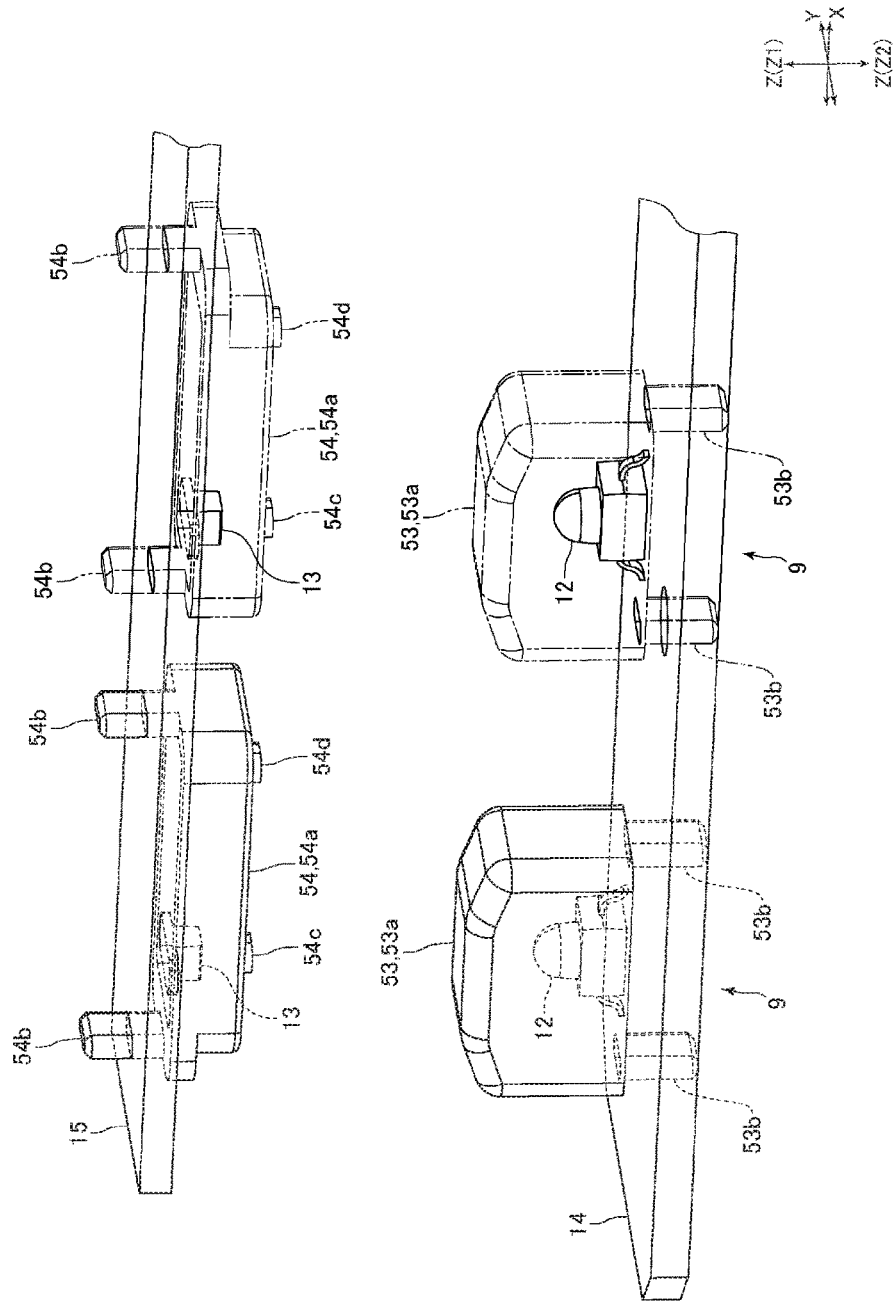
FIG. 5 is a perspective view showing a state that optical sensors shown in FIG. 1 are mounted on circuit boards.
Figure 6:
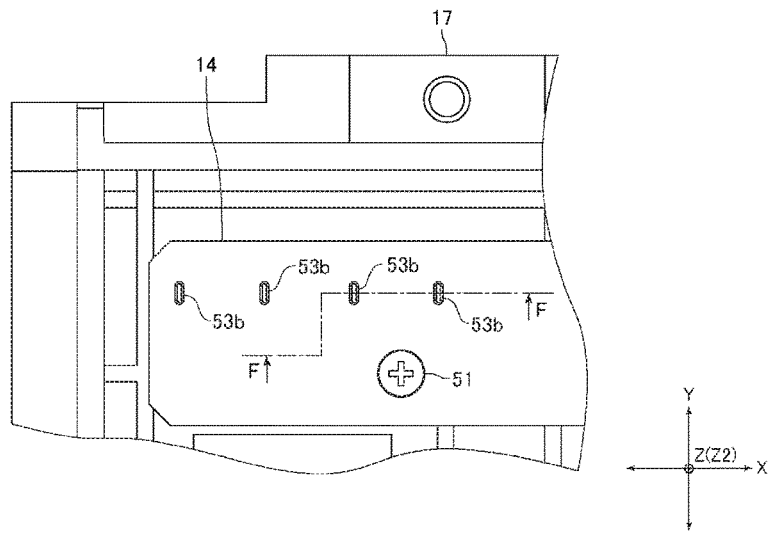
FIG. 6 is a plan view showing the "E" part in FIG. 4.
Figure 7:
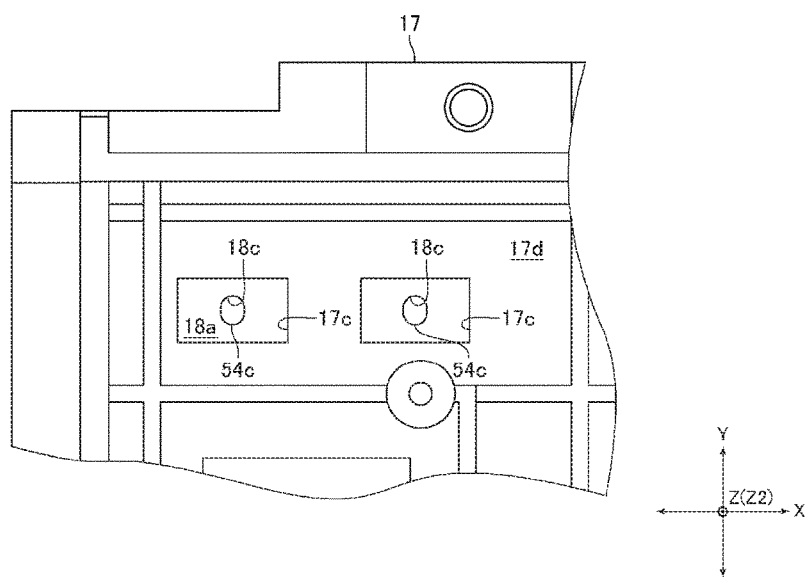
FIG. 7 is a plan view showing a state that a circuit board is detached from the state shown in FIG. 6.
Figure 8:
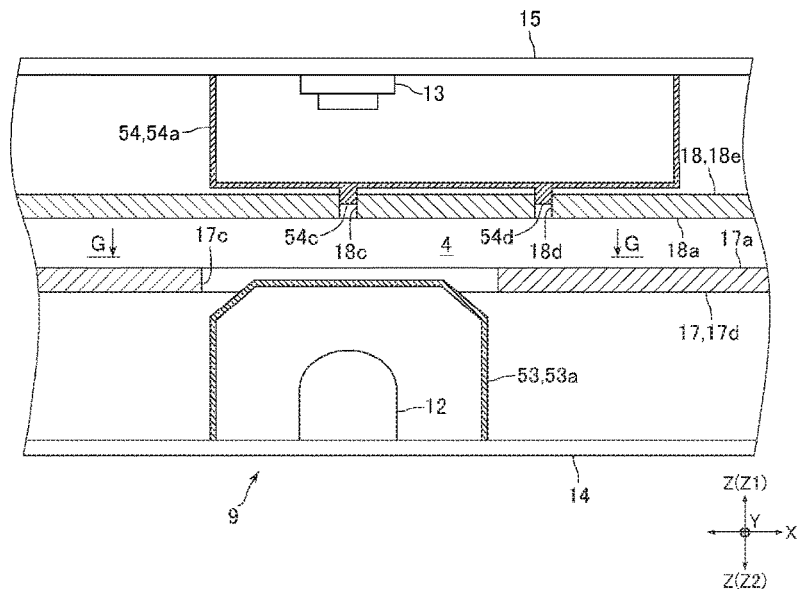
FIG. 8 is a cross-sectional view corresponding to the "F-F" cross section in FIG. 6.
Figure 9:
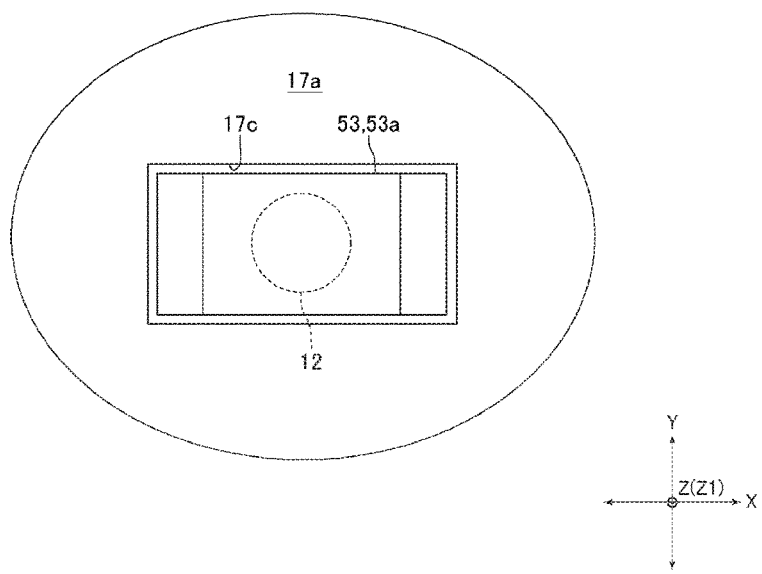
FIG. 9 is a plan view showing a cover member and a transmission hole which are viewed in the "G-G" direction in FIG. 8.

FIG. 5 is a perspective view showing a state that the optical sensors 9 shown in FIG. 1 are mounted on the circuit boards 14 and 15. FIG. 6 is a plan view showing the "E" part in FIG. 4. FIG. 7 is a plan view showing a state that the circuit board 14 is detached from the state shown in FIG. 6. FIG. 8 is a cross-sectional view corresponding to the "F-F" cross section in FIG. 6. FIG. 9 is a plan view showing a cover member 53 and a transmission hole 17c which are viewed in the "G-G" direction in FIG. 8. FIG. 8 is a cross-sectional view showing a state that the "F-F" cross section in FIG. 6 is reversed upside down.

As described above, the card reader 1 includes the optical sensor 9 for detecting a card 2 which is conveyed along the card conveying passage 4. The card reader 1 in this embodiment includes a plurality of the optical sensors 9. In other words, the card reader 1 includes a plurality of the light emitting elements 12 and a plurality of the light receiving elements 13. Specifically, the card reader 1 includes four optical sensors 9. Each of four optical sensors 9 is disposed at a predetermined position in the front and rear direction. In accordance with an embodiment of the present invention, the number of the optical sensors 9 in the card reader 1 may be three (3) or less, or five (5) or more.

The light emitting elements 12 are disposed on a lower side with respect to the card conveyance passage 4. Further, the light emitting elements 12 are mounted on an upper face of the circuit board 14. In this embodiment, four light emitting elements 12 are mounted on one piece of the circuit board 14. In other words, four light emitting elements 12 are mounted on the common circuit board 14. The circuit board 14 is attached to the lower frame 17 so that a thickness direction of the circuit board 14 and the upper and lower direction are coincided with each other. Specifically, the circuit board 14 is fixed to an under face side of the lower frame 17 by screws 51 (see FIGS. 4 and 6) which are engaged from a lower side with female screws (not shown) formed on the under face side of the lower frame 17. The circuit board 14 is capable of being easily detached from the lower frame 17 by detaching the screws 51.

The light receiving elements 13 are disposed on an upper side with respect to the card conveyance passage 4. Further, the light receiving elements 13 are mounted on an under face of the circuit board 15. The card reader 1 in this embodiment includes two circuit boards 15. Two light receiving elements 13 are mounted on one of the circuit boards 15 and remaining two light receiving elements 13 are mounted on the other of the circuit boards 15. In other words, two light receiving elements 13 are mounted on the common circuit board 15, and remaining two light receiving elements 13 are mounted on another one piece of the common circuit board 15. The circuit board 15 is attached to the upper frame 18 so that a thickness direction of the circuit board 15 and the upper and lower direction are coincided with each other. Specifically, the circuit board 15 is fixed to an upper face side of the upper frame 18 by a screw 52 (see FIG. 3) which is engaged from an upper side with a female screw (not shown) formed on the upper face side of the upper frame 18.

The light emitting element 12 is covered by a cover member 53. Specifically, the card reader 1 includes four cover members 53 and each of the four light emitting elements 12 is covered by each of the four cover members 53. The cover member 53 is formed of light transmissive material which transmits light. For example, the cover member 53 is formed of transparent resin material. Further, the cover member 53 is, as shown in FIG. 5, provided with a main body part 53a, which is formed in a substantially rectangular parallelepiped box shape whose lower end is opened, and two projecting parts 53b which are protruded to a lower side from both end sides in the front and rear direction of a lower end face of the main body part 53a. In FIG. 8, the projecting parts 53b are not shown.

The cover member 53 is fixed to the circuit board 14. Specifically, the circuit board 14 is formed with through-holes into which the projecting parts 53b are inserted, and the cover member 53 is fixed to the circuit board 14 by an adhesive in a state that the projecting parts 53b are inserted into the through-holes and that a lower end face of the main body part 53a and an upper face of the circuit board 14 are closely contacted with each other. The light emitting element 12 is disposed in a sealed space which is formed between the main body part 53a and the circuit board 14 and the entire light emitting element 12 is covered by the main body part 53a. Further, when viewed in the upper and lower direction, the center of the cover member 53 and the center of the light emitting element 12 are substantially coincided with each other.

The light receiving element 13 is covered by a cover member 54. Specifically, the card reader 1 includes four cover members 54 and each of the four light receiving elements 13 is covered by each of the four cover members 54. Similarly to the cover member 53, the cover member 54 is formed of light transmissive material which transmits light. For example, the cover member 54 is formed of transparent resin material. Further, the cover member 54 is, as shown in FIG. 5, provided with a main body part 54a, which is formed in a substantially rectangular parallelepiped box shape whose upper end is opened, and two projecting parts 54b which are protruded to an upper side from both end sides in the front and rear direction of an upper end face of the main body part 54a. In FIG. 8, the projecting parts 54b are not shown.

The cover member 54 is fixed to the circuit board 15. Specifically, the circuit board 15 is formed with through-holes into which the projecting parts 54b are inserted, and the cover member 54 is fixed to the circuit board 15 by an adhesive in a state that the projecting parts 54b are inserted into the through-holes and that an upper end face of the main body part 54a and an under face of the circuit board 15 are closely contacted with each other. The light receiving element 13 is disposed in a sealed space which is formed between the main body part 54a and the circuit board 15 and the entire light receiving element 13 is covered by the main body part 54a.

An under face of the main body part 54a is formed with two projecting parts 54c and 54d which are slightly protruded from an under face of the main body part 54a. The projecting parts 54c and 54d are formed so that their shapes when viewed in the upper and lower direction are substantially elongated circular shapes. Further, the projecting parts 54c and 54d are formed in a separated state from each other with a predetermined space therebetween in the front and rear direction. When viewed in the upper and lower direction, the center of the light receiving element 13 and the center of the projecting part 54c are coincided with each other. Further, when viewed in the upper and lower direction, an outward shape of the projecting part 54c is set to be smaller than an outward shape of the light receiving element 13.

The lower frame 17 is formed with a transmission hole 17c for transmitting a light from the light emitting element 12 toward the light receiving element 13. As shown in FIG. 8, the transmission hole 17c is formed so as to penetrate through a flat plate-shaped conveyance guide part 17d on which the conveyance face 17a is formed. The transmission hole 17c is formed so as to be a rectangular shape when viewed in the upper and lower direction. Further, the transmission hole 17c is formed at a position where the center of the transmission hole 17c and the center of the cover member 53 are substantially coincided with each other when viewed in the upper and lower direction. A part of an upper end side of the cover member 53 is disposed in the transmission hole 17c, and the light emitting element 12 is disposed on a lower side with respect to the conveyance guide part 17d. As shown in FIG. 9, a gap space is formed between the cover member 53 and the transmission hole 17c (specifically, between the main body part 53a and the transmission hole 17c) when viewed in the upper and lower direction. The transmission hole 17c in this embodiment is a first transmission hole.

The upper frame 18 is formed with a transmission hole 18c for transmitting the light from the light emitting element 12 toward the light receiving element 13. As shown in FIG. 8, the transmission hole 18c is formed so as to penetrate through a flat plate-shaped conveyance guide part 18e on which the conveyance face 18a is formed. The transmission hole 18c is formed so that its shape when viewed in the upper and lower direction is a substantially elongated circular shape. A projecting part 54c of the cover member 54 is inserted into the transmission hole 18c, and the light receiving element 13 is disposed on an upper side with respect to the conveyance guide part 18e. An inner peripheral face of the transmission hole 18c and an outer peripheral face of the projecting part 54c are contacted with each other. As described above, when viewed in the upper and lower direction, an outward shape of the projecting part 54c is smaller than an outward shape of the light receiving element 13 and, when viewed in the upper and lower direction, the transmission hole 18c is smaller than the outward shape of the light receiving element 13. The transmission hole 18c in this embodiment is a second transmission hole.

The transmission hole 18c is formed so that the center of the transmission hole 17c and the center of the transmission hole 18c are substantially coincided with each other when viewed in the upper and lower direction. Further, the transmission hole 18c is set to be smaller than the transmission hole 17c when viewed in the upper and lower direction. In other words, the transmission hole 17c is larger than the transmission hole 18c. Therefore, when the circuit board 14 is detached from a state shown in FIG. 6, the entire transmission hole 18c and the entire projecting part 54c are exposed through the transmission hole 17c as shown in FIG. 7. In other words, after the circuit board 14 fixed to the lower frame 17 is detached and, when the card reader 1 is viewed from the lower side, the entire transmission hole 18c and the entire projecting part 54c are observed in the transmission hole 17c. In this embodiment, the upper frame 18 is, as shown in FIG. 8, formed with an insertion hole 18d into which the projecting part 54d is inserted. The insertion hole 18d is similarly formed to the transmission hole 18c, and an inner peripheral face of the insertion hole 18d and an outer peripheral face of the projecting part 54d are contacted with each other.

(Structure of IC Contact Module and its Peripheral Portion)

Figure 10:
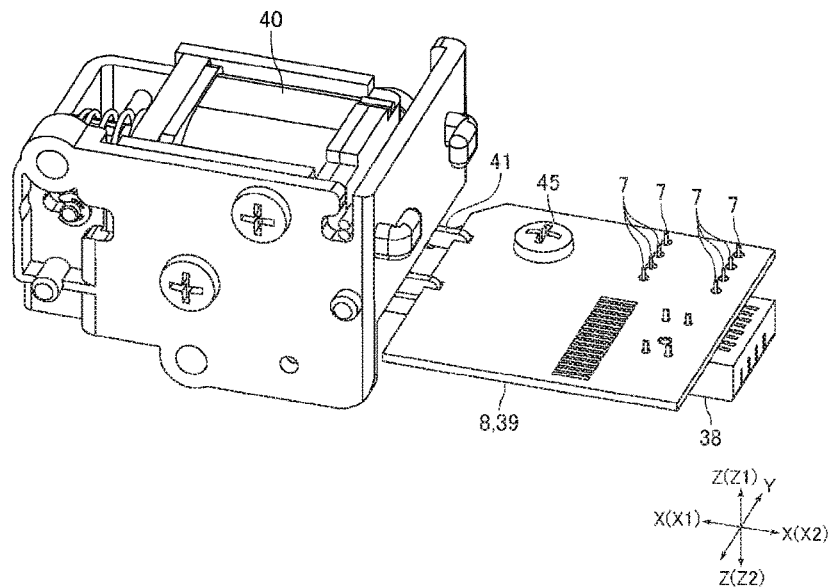
FIG. 10 is a perspective view showing an IC contact module and its peripheral portion shown in FIG. 3.
Figure 11:
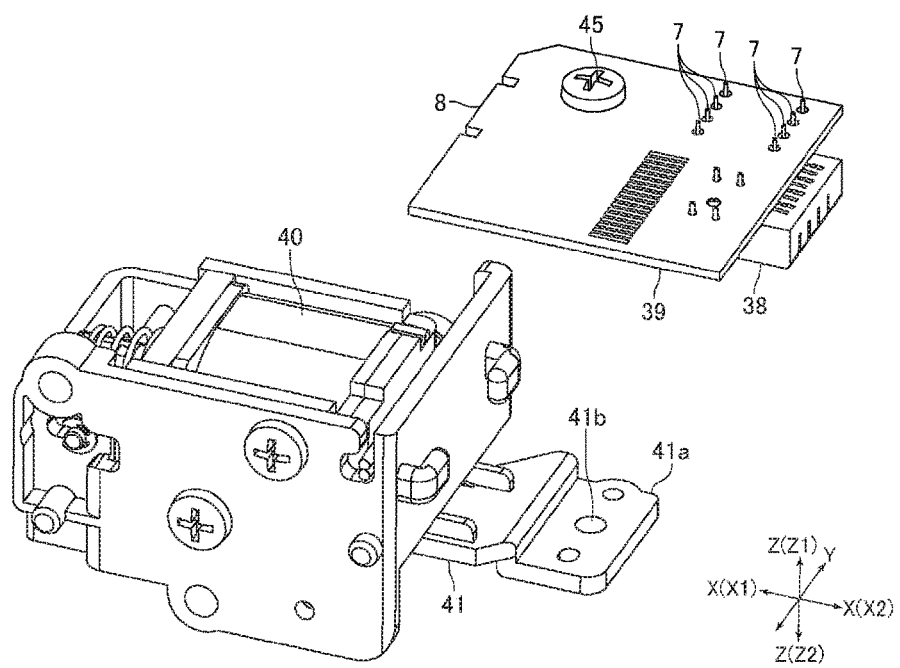
FIG. 11 is an exploded perspective view showing a state that an IC contact module is detached from a lever member shown in FIG. 10.
Figure 12A:
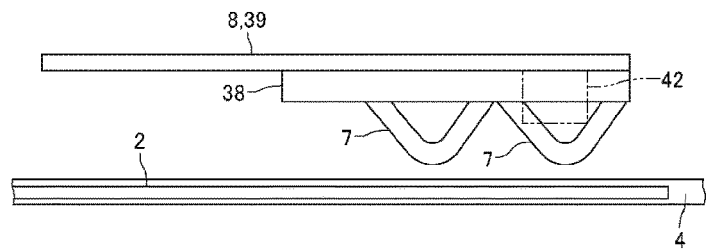
FIGS. 12A, 12B, 12C and 12D are explanatory schematic views showing a movement of an IC contact module shown in FIG. 10.
Figure 12B:
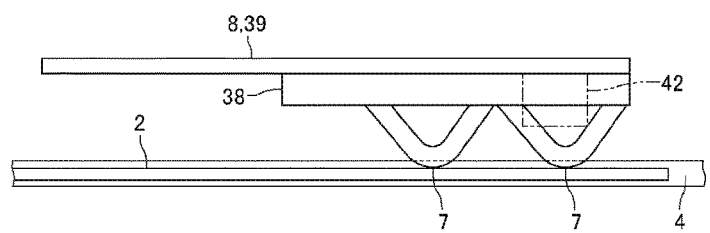
Figure 12C:
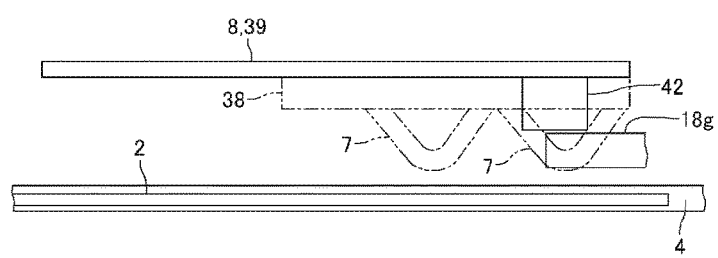
Figure 12D:
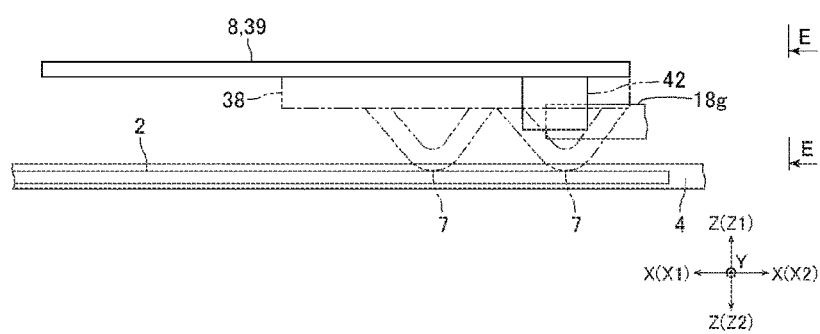
Figure 13:
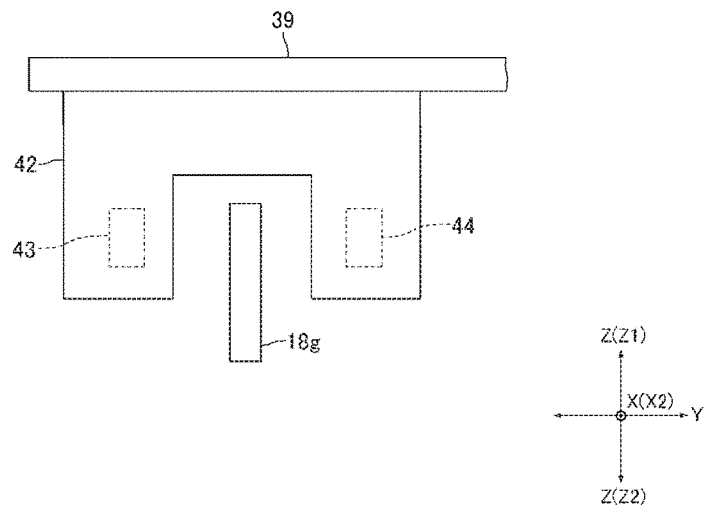
FIG. 13 is a view showing an optical sensor and a light intercepting part viewed in the "E-E" direction in FIG. 12D.

FIG. 10 is a perspective view showing the IC contact module 8 and its peripheral portion shown in FIG. 3. FIG. 11 is an exploded perspective view showing a state that the IC contact module 8 is detached from a lever member 41 shown in FIG. 10. FIGS. 12A, 12B, 12C and 12D are explanatory schematic views showing a movement of the IC contact module 8 shown in FIG. 10. FIGS. 12A and 12C are views showing a state when the IC contact module 8 is located at a retreated position where IC contact springs 7 are retreated from the card conveyance passage 4. FIGS. 12B and 12D are views showing a state when the IC contact module 8 is located at a contact position where the IC contact springs 7 are capable of contacting with external connection terminals 2b. FIG. 13 is a view showing an optical sensor 42 and a light intercepting part 18g viewed in the "E-E" direction in FIG. 12D.

As described above, the card reader 1 includes the IC contact module 8. Further, the card reader 1 includes the solenoid 40 as a drive source, which is structured to move the IC contact module 8 between a retreated position (position shown in FIGS. 12A and 12C) where the IC contact springs 7 are retreated from the card conveyance passage 4 and a contact position (position shown in FIGS. 12B and 12D) where the IC contact springs 7 are capable of contacting with external connection terminals 2b of a card 2, and the lever member 41 which connects the IC contact module 8 with the solenoid 40.

The solenoid 40 is fixed to the upper frame 18 and is disposed on an upper side with respect to the card conveyance passage 4. Further, the solenoid 40 is disposed so that a plunger of the solenoid 40 is protruded to a front side. The lever member 41 is supported by the upper frame 18 so as to be capable of turning with the right and left direction as an axial direction of turning and the lever member 41 is disposed on an upper side with respect to the card conveyance passage 4. A front end side portion of the lever member 41 is connected with the plunger of the solenoid 40.

A rear end side portion of the lever member 41 is structured to be a module fixing part 41a to which the IC contact module 8 is fixed (see FIG. 11). The module fixing part 41a is formed in a flat plate shape and is disposed so that a thickness direction of the module fixing part 41a and the upper and lower direction are substantially coincided with each other. The module fixing part 41a is disposed on a rear side with respect to a rear end of the solenoid 40. Further, the module fixing part 41a is formed with a female screw 41b with which a screw 45 described below is engaged.

The IC contact module 8 located at the retreated position is disposed on an upper side with respect to the card conveyance passage 4 and the IC contact module 8 is disposed so that the IC contact springs 7 face the card conveyance passage 4 from an upper side. The IC contact module 8 includes an IC contact block 38 which holds the IC contact springs 7 and a circuit board 39 with which the IC contact springs 7 are electrically connected. The circuit board 39 is a rigid circuit board such as a glass epoxy board and is formed in a substantially rectangular flat plate shape. The circuit board 39 is disposed so that a thickness direction of the circuit board 39 and the upper and lower direction are substantially coincided with each other. The IC contact block 38 is formed in a flat rectangular solid shape. The IC contact block 38 is disposed on a lower side of a rear end side portion of the circuit board 39, and the IC contact springs 7 are disposed on a lower side of a rear end side portion of the circuit board 39. In this embodiment, upper end side portions of the IC contact springs 7 are inserted and soldered to the circuit board 39.

The IC contact module 8 is fixed to the module fixing part 41a of the lever member 41. Specifically, the circuit board 39 is fixed to the module fixing part 41a. More specifically, the circuit board 39 is fixed to the module fixing part 41a in a state that a front end side portion of the circuit board 39 (in other words, a part of the front end side of the IC contact module 8) is overlapped with the module fixing part 41a from an upper side (in other words, in a state that a front end side portion of the circuit board 39 is placed on an upper face of the module fixing part 41a). Further, the circuit board 39 is fixed to the module fixing part 41a by the screw 45 which is engaged with the female screw 41b of the module fixing part 41a from an upper side.

When viewed in the upper and lower direction, the solenoid 40 and the screw 45 are not overlapped and are displaced from each other. Specifically, the solenoid 40 and the screw 45 are displaced from each other in the front and rear direction and, as shown in FIG. 3, when the card reader 1 is viewed from an upper side, the entire screw 45 can be observed. Further, in this embodiment, when viewed in the upper and lower direction, the IC contact module 8 and the solenoid 40 are not overlapped and are displaced from each other in the front and rear direction. Therefore, as shown in FIG. 3, when the card reader 1 is viewed from an upper side, the entire circuit board 39 is observed. In this embodiment, the card reader 1 may include a cover (not shown) which covers the upper frame 18 from an upper side. In this case, when the card reader 1 is viewed from an upper side in a state that the cover is opened, the entire screw 45 and the entire circuit board 39 can be observed.

Further, the IC contact module 8 includes an optical sensor 42 which is mounted on the circuit board 39. The optical sensor 42 is, as shown in FIG. 13, a transmission type optical sensor having a light emitting element 43 and a light receiving element 44 oppositely disposed to the light emitting element 43. The light emitting element 43 and the light receiving element 44 are faced each other in the right and left direction. The optical sensor 42 is mounted on an under face of the circuit board 39. Further, the optical sensor 42 is, for example, disposed so as to be adjacent to the IC contact block 38 in the right and left direction.

The upper frame 18 is formed with a light intercepting part 18g for intercepting a light between the light emitting element 43 and the light receiving element 44 of the optical sensor 42. The light intercepting part 18g is, for example, formed in a flat plate shape and is disposed so that a thickness direction of the light intercepting part 18g and the right and left direction are coincided with each other. In this embodiment, when the IC contact module 8 is located at a retreated position, as shown in FIG. 12C, the light intercepting part 18g is separated from a space between the light emitting element 43 and the light receiving element 44. When the IC contact module 8 is moved to a contact position from this state, as shown in FIGS. 12D and 13, the space between the light emitting element 43 and the light receiving element 44 is intercepted by the light intercepting part 18g and it is detected that the IC contact module 8 has been moved to the contact position. The upper frame 18 in this embodiment is the frame which is formed with the conveyance face 18a of the card conveyance passage 4.

(Structure of Magnetic Head Module and its Peripheral Portion)

Figure 14:
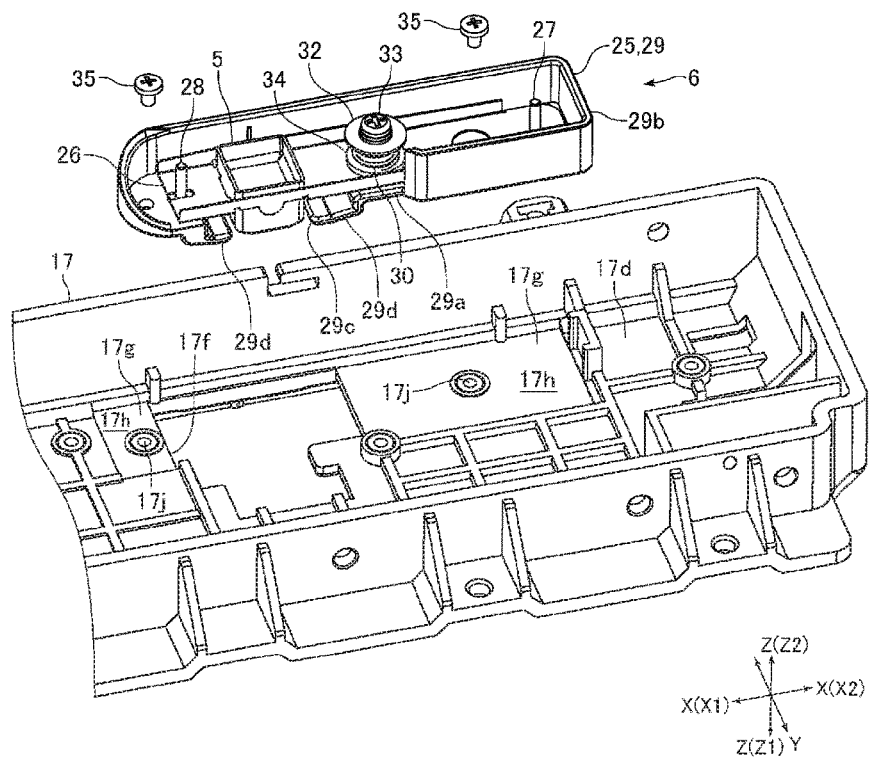
FIG. 14 is an exploded perspective view showing a state that a magnetic head module shown in FIG. 4 is detached from a lower frame.
Figure 15:
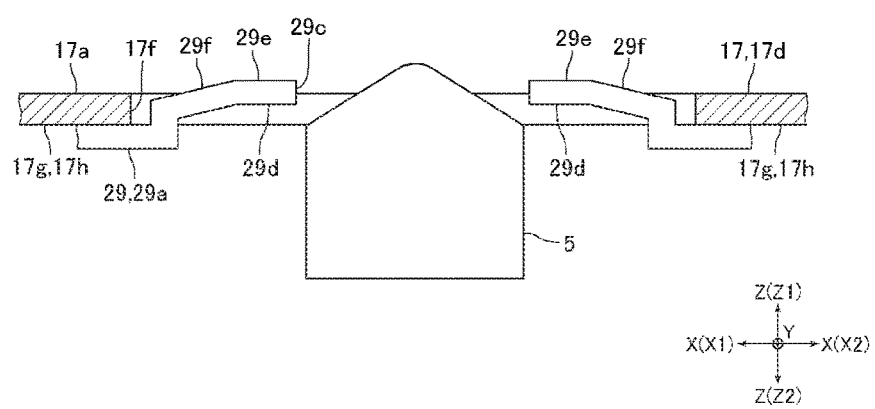
FIG. 15 is a cross-sectional view showing a state that a magnetic head and a guide part are disposed in an opening part of a lower frame shown in FIG. 14.

FIG. 14 is an exploded perspective view showing a state that the magnetic head module 6 shown in FIG. 4 is detached from the lower frame 17. FIG. 15 is a cross-sectional view showing a state that the magnetic head 5 and a guide part 29d are disposed in an opening part 17f of the lower frame 17 shown in FIG. 14.

The magnetic head 5 is disposed so as to face the card conveyance passage 4 from a lower side. Specifically, the magnetic head 5 is disposed so that a magnetic gap of the magnetic head 5 faces the card conveyance passage 4 from a lower side. The magnetic head module 6 is, as shown in FIG. 4, disposed on a side where the circuit board 10 is disposed in the right and left direction. The magnetic head module 6 includes a head holding part 25 which holds the magnetic head 5 so that the magnetic head 5 is capable of turning with the front and rear direction as an axial direction of turning and, in addition, so that the magnetic head 5 is capable of moving in the upper and lower direction. The head holding part 25 includes a plate spring 26 to which the magnetic head 5 is fixed, two support pins 27 and 28 which are respectively inserted into an insertion hole and an insertion groove formed in the plate spring 26, a fixed member 29 to which the support pins 27 and 28 are fixed and which is fixed to the lower frame 17, and a compression coil spring 30 which urges the plate spring 26 to an upper side.

The fixed member 29 is formed of resin material. Further, the fixed member 29 is structured of an upper face part 29a formed in a substantially rectangular flat plate shape which is long and thin in the front and rear direction, and a side wall part 29b which is extended to a lower side from an outer peripheral end of the upper face part 29a. The upper face part 29a is disposed so that a thickness direction of the upper face part 29a and the upper and lower direction are coincided with each other. The upper face part 29a is formed with a cut-out part 29c where an upper end side portion of the magnetic head 5 is disposed. A guide part 29d is formed on both sides of the cut-out part 29c in the front and rear direction. In other words, the upper face part 29a is formed with the guide parts 29d which are disposed on both sides of the magnetic head 5 in the front and rear direction.

An upper face of a portion except the guide part 29d of the upper face part 29a is formed in a flat face shape perpendicular to the upper and lower direction. An upper face of the guide part 29d is disposed on an upper side with respect to the upper face of the portion except the guide part 29d of the upper face part 29a. Further, as shown in FIG. 15, the upper face of the guide part 29d is structured of a perpendicular face 29e perpendicular to the upper and lower direction and an inclined face 29f which is inclined with respect to the perpendicular face 29e. The perpendicular face 29e is disposed on both sides of the cut-out part 29c in the front and rear direction. In the guide part 29d disposed on a front side of the cut-out part 29c, the inclined face 29f is formed so as to be connected with a front end of the perpendicular face 29e, and the inclined face 29f is inclined downward as going to a front side. In the guide part 29d disposed on a rear side of the cut-out part 29c, the inclined face 29f is formed so as to be connected with a rear end of the perpendicular face 29e, and the inclined face 29f is inclined downward as going to a rear side.

The support pins 27 and 28 are fixed to the upper face part 29a so that axial directions of the support pins 27 and 28 and the upper and lower direction are coincided with each other and so as to protrude from the upper face part 29a to a lower side. In other words, upper end side portions of the support pins 27 and 28 are fixed to the upper face part 29a. Further, the support pin 27 is fixed to a rear end side of the upper face part 29a and is disposed on a rear side with respect to the magnetic head 5. The support pin 28 is fixed to a front end side of the upper face part 29a and is disposed on a front side with respect to the magnetic head 5. The support pin 27 and the support pin 28 are disposed at the same position as each other in the right and left direction. The support pins 27 and 28 are formed in long and thin stepped columnar shapes in which outer diameters of upper end side portions of the support pins 27 and 28 are larger than outer diameters of lower end side portions of the support pins 27 and 28.

The plate spring 26 is formed in a substantially rectangular shape which is long and thin in the front and rear direction and is disposed so that a thickness direction of the plate spring 26 and the upper and lower direction are coincided with each other. A rear end side portion of the plate spring 26 is formed with a circular insertion hole into which the support pin 27 is inserted. An inner diameter of the insertion hole is set to be substantially equal to the outer diameter of the lower end side portion of the support pin 27. A front end side portion of the plate spring 26 is formed with an insertion groove into which the support pin 28 is inserted.

The insertion groove is formed in a slit shape which is long and thin in the front and rear direction. Further, a width in the right and left direction of the insertion groove is set to be substantially equal to the outer diameter of the lower end side portion of the support pin 28. The plate spring 26 is disposed on a lower side with respect to the upper face part 29*a*. When the plate spring 26 is to be disposed to a lower side of the upper face part 29*a*, the support pin 27 is inserted into the insertion hole of the plate spring 26 from an upper side, and the support pin 28 is inserted into the insertion groove of the plate spring 26 from an upper side.

The plate spring 26 is formed with a through-hole to which the magnetic head 5 is fixed. The through-hole is formed on a front end side of the plate spring 26 and on a rear side with respect to the insertion groove of the plate spring 26. The magnetic head 5 is fixed to the plate spring 26 so that an upper end side of the magnetic head 5 where a magnetic gap is formed is protruded to an upper side with respect to the plate spring 26.

A projecting part (not shown) formed on the upper face part 29*a* of the fixed member 29 is inserted on an inner peripheral side of the compression coil spring 30. The projecting part is formed in a columnar shape which is protruded to a lower side from an under face of the upper face part 29*a* at a substantially center in the front and rear direction. The plate spring 26 is formed with a through-hole (not shown) into which the projecting part is inserted. A washer 32 is abutted with a lower end face of the projecting part and the washer 32 is fixed by a screw 33. A lower end of the compression coil spring 30 is abutted with an upper face of the washer 32, and an upper end of the compression coil spring 30 is abutted with an under face of the plate spring 26 through a washer 34.

The lower frame 17 is provided with a flat plate-shaped conveyance guide part 17*d* where the conveyance face 17*a* is formed. The conveyance guide part 17*d* is disposed so that a thickness direction of the conveyance guide part 17*d* and the upper and lower direction are coincided with each other. The conveyance guide part 17*d* is formed with an opening part 17*f* where the magnetic head 5 is disposed. The opening part 17*f* is formed so as to penetrate through the conveyance guide part 17*d* in the upper and lower direction. The lower frame 17 in this embodiment is the frame where the conveyance face 17*a* on a lower side of the card conveyance passage 4 is formed.

Both side portions of the conveyance guide part 17*d* with respect to the opening part 17*f* in the front and rear direction are formed as module fixing parts 17*g* where the fixed member 29 of the magnetic head module 6 is fixed. An under face of the module fixing part 17*g* is formed to be an abutting face 17*h* with which the fixed member 29 is abutted from a lower side. The abutting face 17*h* is formed in a flat face shape perpendicular to the upper and lower direction. Further, an under face side of the module fixing part 17*g* is formed with female screws 17*j* with which screws 35 for fixing the magnetic head module 6 are engaged. The female screw 17*j* is formed at two positions on both sides in the front and rear direction with respect to the opening part 17*f*.

The magnetic head module 6 is fixed to the module fixing part 17*g* from a lower side. Specifically, the magnetic head module 6 is fixed to the module fixing part 17*g* by two screws 35 which are engaged from a lower side with the female screws 17*j* of the module fixing part 17*g*. When the card reader 1 is viewed from a lower side in a state that the magnetic head module 6 has been fixed to the module fixing part 17*g*, as shown in FIG. 4, the whole of the two screws 35 can be observed. Further, in a state that the magnetic head module 6 has been fixed to the module fixing part 17*g*, an upper face of a portion except the guide part 29*d* of the upper face part 29*a* is abutted with the abutting face 17*h*. Further, the magnetic head 5 and the guide part 29*d* is disposed in the opening part 17*f* so as to face the card conveyance passage 4. As shown in FIG. 15, the perpendicular face 29*e* of the guide part 29*d* is disposed on an upper side with respect to the conveyance face 17*a*. Further, an upper end of the magnetic head 5 is disposed on an upper side with respect to the perpendicular face 29*e*.

Principal Effects in this Embodiment

As described above, in this embodiment, the cover member 53 is fixed to the circuit board 14 so as to cover the entire light emitting element 12, and the cover member 54 is fixed to the circuit board 15 so as to cover the entire light receiving element 13. Therefore, according to this embodiment, even if dust and dirt entered into the card conveyance passage 4 and/or dust and dirt generated in the card conveyance passage 4 are passed through the transmission hole 17*c* and, even if dust and dirt are entered to arrangement portions of the circuit boards 14 and 15 due to wind or the like, the dust and dirt can be prevented from sticking to the light emitting element 12 and the light receiving element 13. Accordingly, in this embodiment, irrespective of an environment where the card reader 1 is used, dust and dirt can be prevented from sticking to the light emitting element 12 and the light receiving element 13.

In this embodiment, when viewed in the upper and lower direction, a gap space is formed between the cover member 53 and the transmission hole 17*c*. Therefore, according to this embodiment, dust and dirt in the card conveyance passage 4 can be dropped to a lower side of the cover member 53 by utilizing the gap space formed on a lower side of the card conveyance passage 4. Accordingly, in this embodiment, dust and dirt can be restrained from accumulating on an upper face of the cover member 53.

In this embodiment, the transmission hole 17*c* is larger than the transmission hole 18*c* and, when viewed in the upper and lower direction, the center of the transmission hole 17*c* and the center of the transmission hole 18*c* are substantially coincided with each other. Therefore, when the circuit board 14 fixed to the lower frame 17 is detached and the card reader 1 is viewed from a lower side, the whole of the transmission hole 18*c* and the projecting part 54*c* can be observed in the transmission hole 17*c*. Accordingly, in this embodiment, even in a state that the lower frame 17 and the upper frame 18 are fixed to each other so that the card conveyance passage 4 is formed and, even in a state that the circuit board 15 is fixed to the upper frame 18, when the circuit board 14 is detached, an under face of the projecting part 54*c* (in other words, the entire under face of a portion of the cover member 54 where a light from the light emitting element 12 is passed) can be cleaned by utilizing the transmission holes 17*c* and 18*c*.

In this embodiment, when viewed in the upper and lower direction, the transmission hole 18*c* is smaller than an outward shape of the light receiving element 13. Therefore, according to this embodiment, even when four optical sensors 9 are disposed in the card conveyance passage 4, a light emitted from the light emitting element 12 of a certain optical sensor 9 can be prevented from being received by the light receiving element 13 of another optical sensor 9. Further, according to this embodiment, influence of an external light to the light receiving element 13 can be reduced.

In this embodiment, four light emitting elements 12 are mounted on one piece of the circuit board 14. Therefore, according to this embodiment, in a case that the circuit board 14 is detached from the lower frame 17 to clean the cover members 53, when one piece of the circuit board 14 is detached, four cover members 53 can be cleaned together. Further, when one piece of the circuit board 14 is detached, the projecting part 54c can be seen in each of the four transmission holes 17c and thus, when one piece of the circuit board 14 is detached, each of the under faces of four projecting parts 54c can be cleaned by utilizing the transmission holes 17c and 18c. Therefore, according to this embodiment, the cover members 53 and 54 can be cleaned easily.

Further, in this embodiment, two light receiving elements 13 are mounted on one piece of the circuit board 15 and remaining two light receiving elements 13 are mounted on remaining one piece of the circuit board 15. Therefore, in a case that the circuit board 15 is to be detached from the upper frame 18 for cleaning the cover members 54, when two pieces of the circuit boards 15 are detached, four cover members 54 can be cleaned together. Accordingly, in this embodiment, the cover member 54 can be easily cleaned.

As described above, in this embodiment, the solenoid 40, the lever member 41 and the IC contact module 8 located at the retreated position are disposed on an upper side with respect to the card conveyance passage 4, and the IC contact module 8 is fixed to the module fixing part 41a by the screw 45 engaged with the female screw 41b of the module fixing part 41a from an upper side in a state that a front end side portion of the circuit board 39 is overlapped with the module fixing part 41a from the upper side. Further, in this embodiment, when viewed in the upper and lower direction, the solenoid 40 and the screw 45 are not overlapped with each other, and the screw 45 can be observed when the card reader 1 is viewed from an upper side.

Therefore, according to this embodiment, even in a case that the upper frame 18 to which the IC contact module 8 and the solenoid 40 are attached is structured so as not to be capable of turning with respect to the lower frame 17 and, even when the solenoid 40 is not detached from the upper frame 18, the IC contact module 8 can be attached to and detached from the lever member 41 from an upper side by attaching and detaching the screw 45 from the upper side. Accordingly, in this embodiment, the IC contact module 8 can be exchanged easily while simplifying a structure of the card reader 1.

Further, in this embodiment, when viewed in the upper and lower direction, the IC contact module 8 and the solenoid 40 are not overlapped and displaced from each other. Therefore, when the IC contact module 8 is to be attached to and detached from the lever member 41, the solenoid 40 and the IC contact module 8 can be prevented from interfering with each other. Accordingly, in this embodiment, the IC contact module 8 can be further easily exchanged. Further, in this embodiment, the solenoid 40 and the IC contact module 8 are displaced from each other in the front and rear direction and thus the size of the card reader 1 can be reduced in the upper and lower direction and the right and left direction.

In this embodiment, the optical sensor 42 for detecting that the IC contact module 8 has been moved to a contact position is mounted on the circuit board 39. Therefore, according to this embodiment, even when the optical sensor 9 is provided for detecting that the IC contact module 8 has been moved to a contact position, a circuit board on which the optical sensor 9 is mounted is not required to be separately provided in addition to the circuit board 39 with which the IC contact springs 7 are electrically connected. Accordingly, in this embodiment, a structure of the card reader 1 can be simplified.

As described above, in this embodiment, the magnetic head module 6 disposed so as to face the card conveyance passage 4 from a lower side is fixed to the module fixing part 17g from a lower side by the two screws 35 which are engaged with the female screws 17j of the module fixing part 17g from a lower side. Therefore, the whole of the two screws 35 can be seen when the card reader 1 is viewed from a lower side. Accordingly, in this embodiment, when the screws 35 are attached and detached from a lower side, the magnetic head module 6 can be attached to and detached from the lower frame 17 from a lower side. Therefore, according to this embodiment, even in a state that the circuit board 10 is attached along one of side faces in the right and left direction of the main body frame 16 and, even when an operational hole is not formed in the circuit board 10, the magnetic head module 6 can be exchanged easily.

In this embodiment, the guide parts 29d disposed on both sides of the magnetic head 5 in the front and rear direction are formed in the fixed member 29 which structures the magnetic head module 6, and the guide parts 29d are disposed in the opening part 17f of the lower frame 17 so as to face the card conveyance passage 4 together with the magnetic head 5. Therefore, according to this embodiment, a protruding amount of the magnetic head 5 protruding toward the card conveyance passage 4 from the guide parts 29d can be set with a high degree of accuracy. Further, in this embodiment, the perpendicular face 29e of the guide part 29d is disposed on an upper side with respect to the conveyance face 17a and thus a contact pressure of the magnetic head 5 with a card 2 conveyed along the card conveyance passage 4 can be set with a high degree of accuracy. Therefore, according to this embodiment, reading of magnetic data recorded in a card 2 and/or recording of magnetic data to a card 2 can be performed appropriately.

Other Embodiments

Although the present invention has been shown and described with reference to a specific embodiment, various changes and modifications will be apparent to those skilled in the art from the teachings herein.

In the embodiment described above, the card reader 1 includes one piece of the circuit board 14 and four light emitting elements 12 are mounted on one piece of the circuit board 14. However, the present invention is not limited to this embodiment. For example, the number of the circuit boards 14 included in the card reader 1 may be two, three or four pieces. For example, in a case that the number of pieces of the circuit boards 14 included in the card reader 1 is two, two of four light emitting elements 12 are mounted on one piece of the circuit board 14 and remaining two light emitting elements 12 are mounted on remaining one piece of the circuit board 14. Further, for example, in a case that the number of pieces of the circuit boards 14 included in the card reader 1 is four, one light emitting element 12 is mounted on each of four pieces of the circuit boards 14.

In the embodiment described above, the card reader 1 includes two pieces of the circuit boards 15, and two of four light receiving elements 13 are mounted on one piece of the circuit board 15 and remaining two light receiving elements 13 are mounted on remaining one piece of the circuit board 15. However, the present invention is not limited to this embodiment. For example, four light receiving elements 13 may be mounted on one piece of the circuit board 15. Further, the number of the circuit boards 15 included in the card reader 1 may be three or four pieces. For example, in a case that the number of pieces of the circuit boards 15 included in the card reader 1 is four, one light receiving element 13 is mounted on each of four pieces of the circuit boards 15.

In the embodiment described above, the circuit board 14 on which the light emitting element 12 is mounted is fixed to the lower frame 17, and the circuit board 15 on which the light receiving element 13 is mounted is fixed to the upper frame 18. However, it may be structured so that the circuit board 14 is fixed to the upper frame 18 and the circuit board 15 is fixed to the lower frame 17. In this case, it may be structured so that the light emitting element 12 is covered by the cover member 54 fixed to the circuit board 14 and that the light receiving element 13 is covered by the cover member 53 fixed to the circuit board 15. Further, in this case, for example, when viewed in the upper and lower direction, the center of the light emitting element 12 and the center of the projecting part 54c are coincided with each other and the transmission hole 18c is smaller than an outward shape of the light emitting element 12.

Also in this case, dust and dirt in the card conveyance passage 4 can be dropped to a lower side of the cover member 53 by utilizing the gap space between the cover member 53 and the transmission hole 17c and thus dust and dirt can be restrained from accumulating on an upper face of the cover member 53. Further, also in this case, a light emitted from the light emitting element 12 of a certain optical sensor 9 can be prevented from being received by the light receiving element 13 of another optical sensor 9. In this case, the cover member 53 is regarded as the second cover member and the cover member 54 is regarded as the first cover member.

In the embodiment described above, the size of the transmission hole 18c is smaller than an outward shape of the light receiving element 13 when viewed in the upper and lower direction. However, the size of the transmission hole 18c when viewed in the upper and lower direction may be set larger than an outward shape of the light receiving element 13. Further, in the embodiment described above, the transmission hole 18c is smaller than the transmission hole 17c. However, the size of the transmission hole 18c may be set not less than that of the transmission hole 17c.

In the embodiment described above, when viewed in the upper and lower direction, a gap space is formed between the cover member 53 and the transmission hole 17c. However, it may be structured that, when viewed in the upper and lower direction, no gap space is formed between the cover member 53 and the transmission hole 17c. Further, in the embodiment described above, the card reader 1 is disposed so that a thickness direction of a card 2 and the upper and lower direction are coincided with each other. However, for example, the card reader 1 may be disposed so that a thickness direction of a card 2 and a horizontal direction are coincided with each other.

In the embodiment described above, the solenoid 40 and the screw 45 are displaced from each other in the front and rear direction. However, the present invention is not limited to this embodiment. For example, the solenoid 40 and the screw 45 may be displaced from each other in the right and left direction or may be displaced from each other in both directions of the front and rear direction and the right and left direction. Further, in the embodiment described above, the IC contact module 8 and the solenoid 40 are displaced from each other in the front and rear direction. However, the IC contact module 8 and the solenoid 40 may be displaced from each other in the right and left direction or may be displaced from each other in both directions of the front and rear direction and the right and left direction. Further, in the embodiment described above, when viewed in the upper and lower direction, the IC contact module 8 and the solenoid 40 are not overlapped with each other. Therefore, when the card reader 1 is viewed from an upper side, the entire circuit board 39 can be observed. However, it may be structured that, when viewed in the upper and lower direction, a part of the IC contact module 8 and a part of the solenoid 40 are overlapped with each other.

In the embodiment described above, the circuit board 39 is fixed to the module fixing part 41a. However, another portion of the IC contact module 8 such as the IC contact block 38 may be fixed to the module fixing part 41a. Further, in the embodiment described above, the IC contact module 8 is moved between the retreated position and the contact position by the solenoid 40. However, the IC contact module 8 may be moved between the retreated position and the contact position by a motor.

In the embodiment described above, the optical sensor 42 is mounted on the circuit board 39 and the light intercepting part 18g is formed in the upper frame 18. However, it may be structured that the optical sensor 42 is mounted on a circuit board which is attached to the upper frame 18 and that a light intercepting part corresponding to the light intercepting part 18g is provided in the IC contact module 8.

In the embodiment described above, the plate spring 26 is urged to an upper side by the compression coil spring 30. However, the plate spring 26 may be urged to an upper side by another spring member such as a plate spring. Further, in the embodiment described above, the guide parts 29d are disposed in the opening part 17f of the lower frame 17. However, no guide part 29d may be disposed in the opening part 17f. In this case, no guide part 29d may be formed in the fixed member 29.

Further, in the embodiment described above, a magnetic information recording medium is a card 2. However, a magnetic information recording medium may be another medium such as a bankbook other than a card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card, the card reader comprising:
   a card conveyance passage where the card is conveyed;
   an optical sensor structured to detect the card conveyed along the card conveyance passage, the optical sensor comprising a light emitting element and a light receiving element which are oppositely disposed so as to interpose the card conveyance passage in a thickness direction of the card conveyed along the card conveyance passage;
   a first circuit board on which the light emitting element is mounted;

a second circuit board on which the light receiving element is mounted;
a first cover member which covers the light emitting element;
a second cover member which covers the light receiving element;
a first frame comprising a conveyance face on a first direction side of the card conveyance passage wherein one side in the thickness direction of the card conveyed along the card conveyance passage is referred to as a first direction and its opposite direction is referred to as a second direction; and
a second frame comprising a conveyance face on a second direction side of the card conveyance passage;
wherein the first frame is comprises a first transmission hole for transmitting a light from the light emitting element to the light receiving element, and the first frame is attached with one of the first circuit board and the second circuit board;
wherein the second frame comprises a second transmission hole for transmitting the light from the light emitting element to the light receiving element, and the second frame is attached with the other of the first circuit board and the second circuit board;
wherein the first cover member is fixed to the first circuit board so as to cover the entire light emitting element; and
wherein the second cover member is fixed to the second circuit board so as to cover the entire light receiving element.

2. The card reader according to claim 1, wherein
the card reader is disposed so that the thickness direction of the card and an upper and lower direction are coincided with each other,
the first frame is formed with the conveyance face on a lower side of the card conveyance passage,
the second frame is formed with the conveyance face on an upper side of the card conveyance passage,
in a case that the first circuit board is attached to the first frame, a gap space is formed between the first cover member and the first transmission hole when viewed in an upper and lower direction, and
in a case that the second circuit board is attached to the first frame, a gap space is formed between the second cover member and the first transmission hole when viewed in the upper and lower direction.

3. The card reader according to claim 2, wherein
the first transmission hole is set to be larger than the second transmission hole,
in the case that the first circuit board is attached to the first frame, the second transmission hole is set to be smaller than an outward shape of the light receiving element when viewed in the upper and lower direction, and
in the case that the second circuit board is attached to the first frame, the second transmission hole is set to be smaller than an outward shape of the light emitting element when viewed in the upper and lower direction.

4. The card reader according to claim 3, wherein
the first circuit board is attached to the first frame, and
the second transmission hole is smaller than the outward shape of the light receiving element when viewed in the upper and lower direction.

5. The card reader according to claim 4, wherein
each of the first cover member and the second cover member is formed of light transmissive material which transmits light,
each of the first transmission hole and the second transmission hole is a through-hole, and
a projection formed in the second cover member is inserted into the second transmission hole so as to be exposed to a first frame side.

6. The card reader according to claim 1, wherein
the card reader comprises a plurality of the light emitting elements and a plurality of the light receiving elements,
the plurality of the light emitting elements are mounted on the first circuit board which is common to the light emitting elements, and
the plurality of the light receiving elements are mounted on the second circuit board which is common to the light receiving elements.

7. The card reader according to claim 6, wherein
the first cover member is provided by the same number as the plurality of the light emitting elements so that each of the first cover members corresponds to each of the light emitting elements, and
the second cover member is provided by the same number as the plurality of the light receiving elements so that each of the second cover members corresponds to each of the light receiving elements.

8. The card reader according to claim 7, wherein
the card reader is disposed so that the thickness direction of the card and an upper and lower direction are coincided with each other,
the first frame is formed with the conveyance face on a lower side of the card conveyance passage,
the second frame is formed with the conveyance face on an upper side of the card conveyance passage,
the first transmission hole is provided by the same number of the plurality of the light emitting elements,
the second transmission hole is provided by the same number as the plurality of the light receiving elements,
in a case that the first circuit board which is common to the light emitting elements is attached to the first frame, a gap space is formed between each of the first cover members and each of the first transmission holes when viewed in an upper and lower direction, and
in a case that the second circuit board which is common to the light receiving elements is attached to the first frame, a gap space is formed between each of the second cover members and each of the first transmission holes when viewed in the upper and lower direction.

9. The card reader according to claim 8, wherein
each of the first transmission holes is set to be larger than each of the second transmission holes,
in the case that the first circuit board is attached to the first frame, each of the second transmission holes is set to be smaller than an outward shape of each of the light receiving elements when viewed in the upper and lower direction, and
in the case that the second circuit board is attached to the first frame, each of the second transmission holes is set to be smaller than an outward shape of each of the light emitting elements when viewed in the upper and lower direction.

10. A card reader structured so that IC contact springs are contacted with external connection terminals of an IC contact formed on a card to perform data communication with the card, the card reader comprising:
an IC contact module comprising the IC contact springs and a circuit board in a flat plate shape which is electrically connected with the IC contact springs;
a card conveyance passage where the card is conveyed;

a drive source structured to move the IC contact module between a retreated position where the IC contact springs are retreated from the card conveyance passage and a contact position where the IC contact springs are capable of contacting with the external connection terminals; and a lever member which connects the drive source with the IC contact module;

wherein when one side in a thickness direction of the card conveyed along the card conveyance passage is referred to as a first direction and the other side is referred to as a second direction, the drive source, the lever member and the IC contact module located at the retreated position are disposed on a second direction side with respect to the card conveyance passage;

wherein the lever member comprises a module fixing part to which the IC contact module is fixed;

wherein the IC contact module is fixed to the module fixing part by a screw engaging with the module fixing part from the second direction side in a state that a part of the IC contact module is overlapped with the module fixing part from the second direction side; and wherein the drive source and the screw are not overlapped with each other and are displaced from each other when viewed in the thickness direction of the card.

11. The card reader according to claim 10, wherein a part of the circuit board is overlapped with the module fixing part from the second direction side, and the circuit board is fixed to the module fixing part by the screw.

12. The card reader according to claim 10, wherein the drive source and the IC contact module are not overlapped with each other and are displaced from each other when viewed in the thickness direction of the card.

13. The card reader according to claim 12, wherein the drive source and the IC contact module are displaced from each other in a conveying direction of the card conveyed along the card conveyance passage.

14. The card reader according to claim 10, further comprising a frame which is formed with a conveyance face of the card conveyance passage, wherein the IC contact module comprises an optical sensor having a light emitting element and a light receiving element oppositely disposed to the light emitting element, and the optical sensor is mounted on the circuit board, wherein the frame comprises a light intercepting part structured to intercept a light from the light emitting element to the light receiving element, and wherein when the IC contact module is moved to the contact position, the light from the light emitting element to the light receiving element is intercepted by the light intercepting part and thereby it is detected that the IC contact module has been moved to the contact position.

15. The card reader according to claim 14, wherein a part of the circuit board is overlapped with the module fixing part from the second direction side, and the circuit board is fixed to the module fixing part by the screw.

16. A magnetic information recording medium processing device for use with a magnetic information recording medium, the device comprising:

a medium conveyance passage where a magnetic information recording medium on which magnetic data are recorded is conveyed;

a magnetic head module comprising a magnetic head disposed so as to face the medium conveyance passage from a first direction side wherein one side in a thickness direction of the magnetic information recording medium conveyed along the medium conveyance passage is referred to as a first direction; and a frame which comprising with a conveyance face on the first direction side of the medium conveyance passage;

wherein the frame comprises an opening part in which the magnetic head is disposed and a module fixing part to which the magnetic head module is fixed;

wherein the magnetic head module comprises a head holding part which holds the magnetic head so that the magnetic head is capable of turning with a conveying direction of the magnetic information recording medium conveyed along the medium conveyance passage as an axial direction of turning, and so that the magnetic head is capable of moving in the thickness direction of the magnetic information recording medium; and wherein the magnetic head module is fixed to the module fixing part from the first direction side.

17. The magnetic information recording medium processing device according to claim 16, wherein the head holding part comprises a fixed member which is fixed to the module fixing part, the fixed member is formed with a guide part which is disposed on both sides with respect to the magnetic head in the conveying direction of the magnetic information recording medium, and the guide part is disposed in the opening part so as to face the medium conveyance passage.

18. The magnetic information recording medium processing device according to claim 17, wherein the magnetic head module is fixed to the module fixing part by a screw engaged with the module fixing part from the first direction side.

19. The magnetic information recording medium processing device according to claim 16, wherein the magnetic head module is fixed to the module fixing part by a screw engaged with the module fixing part from the first direction side.

* * * * *